(12) United States Patent
Toda et al.

(10) Patent No.: US 10,661,701 B2
(45) Date of Patent: May 26, 2020

(54) LIGHTING CIRCUIT AND VEHICULAR LIGHTING DEVICE

(71) Applicant: Koito Manufacturing Co., Ltd., Tokyo (JP)

(72) Inventors: Takeshi Toda, Shizuoka (JP); Kentarou Murakami, Shizuoka (JP); Masayasu Ito, Shizuoka (JP); Takao Muramatsu, Shizuoka (JP); Hidetada Tanaka, Shizuoka (JP); Satoshi Yamamura, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 392 days.

(21) Appl. No.: 15/630,820

(22) Filed: Jun. 22, 2017

(65) Prior Publication Data
US 2017/0282786 A1  Oct. 5, 2017

Related U.S. Application Data

(63) Continuation of application No. PCT/JP2015/085349, filed on Dec. 17, 2015.

(30) Foreign Application Priority Data

Dec. 25, 2014 (JP) ................. 2014-262896
Dec. 25, 2014 (JP) ................. 2014-262897
Sep. 14, 2015 (JP) ................. 2015-180866

(51) Int. Cl.
*F21S 41/00* (2018.01)
*F21S 41/39* (2018.01)
(Continued)

(52) U.S. Cl.
CPC .............. *B60Q 1/076* (2013.01); *B60Q 1/14* (2013.01); *F21S 41/00* (2018.01); *F21S 41/141* (2018.01);
(Continued)

(58) Field of Classification Search
CPC ........ F21S 41/675; F21S 41/00; F21S 41/635; F21S 41/67; F21S 41/141; F21S 41/39;
(Continued)

(56) References Cited

U.S. PATENT DOCUMENTS 9,212,800 B2 * 12/2015 Tanaka ................. F21S 41/19
9,890,910 B2 *  2/2018 Yamamura ........... F21S 10/026
(Continued)

FOREIGN PATENT DOCUMENTS

CN    102186697 A    9/2011
CN    103492228 A    1/2014
(Continued)

OTHER PUBLICATIONS

International Search Report from International Application No. PCT/JP2015/085349, dated Mar. 22, 2016.
(Continued)

*Primary Examiner* — Vibol Tan
(74) *Attorney, Agent, or Firm* — Buchanan Ingersoll & Rooney PC

(57) ABSTRACT

A blade receives light emitted from a light source and repeats a predetermined periodic motion to scan the front of a vehicle with reflected light of the emitted light. A position detector generates a position detection signal S4 indicating a timing at which a predetermined reference point of the blade passes a predetermined position. Based on the position detection signal S4, a period calculator calculates a period Tp of the periodic motion of the blade. A light intensity calculator receives light-distribution-pattern information S3 to be formed in front of the vehicle and calculates light intensity to be generated by the light source at each time based on the position detection signal S4 and the period Tp.

(Continued)

A driver turns on a semiconductor light source so as to obtain the light intensity calculated by the light intensity calculator at each time.

16 Claims, 15 Drawing Sheets

(51) Int. Cl.

| | | |
|---|---|---|
| *B60Q 1/14* | (2006.01) | |
| *B60Q 1/076* | (2006.01) | |
| *F21S 41/141* | (2018.01) | |
| *F21S 41/148* | (2018.01) | |
| *F21S 41/675* | (2018.01) | |
| *F21S 41/255* | (2018.01) | |
| *F21S 41/32* | (2018.01) | |
| *F21Y 115/10* | (2016.01) | |
| *F21W 102/00* | (2018.01) | |

(52) U.S. Cl.
CPC .......... *F21S 41/148* (2018.01); *F21S 41/255* (2018.01); *F21S 41/321* (2018.01); *F21S 41/39* (2018.01); *F21S 41/675* (2018.01); *F21W 2102/00* (2018.01); *F21Y 2115/10* (2016.08)

(58) Field of Classification Search
CPC ...... F21S 41/148; F21S 41/255; F21S 41/321; B60Q 2300/41; B60Q 2300/42; B60Q 1/1423; B60Q 1/0023; B60Q 2300/122; B60Q 1/12; B60Q 2300/322; B60Q 2300/332; B60Q 1/06; B60Q 1/14; B60Q 1/08; B60Q 1/1407; B60Q 1/1415; B60Q 1/076; H05B 33/0845; H05B 33/0842; H05B 33/0848; F21W 2102/13; F21W 2102/00; G02B 26/0833; F21Y 2115/10
See application file for complete search history.

(56) References Cited

U.S. PATENT DOCUMENTS

| | | | | |
|---|---|---|---|---|
| 9,903,557 B2* | 2/2018 | Matsuno | ................. | F21S 41/24 |
| 9,909,731 B2* | 3/2018 | Yamamura | ............ | F21S 41/147 |
| 10,118,535 B2* | 11/2018 | Park | .......................... | B60R 1/00 |
| 10,192,124 B2* | 1/2019 | Yamamura | ............. | B60Q 1/143 |
| 10,259,380 B2* | 4/2019 | Ko | ........................ | F21S 43/241 |

FOREIGN PATENT DOCUMENTS

| | | | |
|---|---|---|---|
| JP | 2003-337658 A | 11/2003 | |
| JP | 2004-333698 A | 11/2004 | |
| JP | 2007-165001 A | 6/2007 | |
| JP | 2008-182115 A | 8/2008 | |
| JP | 2008-205357 A | 9/2008 | |
| JP | 2009-258321 A | 11/2009 | |
| JP | 2012-001078 A | 1/2012 | |
| JP | 2012-027267 A | 2/2012 | |
| JP | 2012-224317 A | 11/2012 | |
| JP | 2012-227102 A | 11/2012 | |
| JP | 2013-154746 A | 8/2013 | |
| JP | 2013-255373 A | 12/2013 | |
| JP | 2014-054892 A | 3/2014 | |

OTHER PUBLICATIONS

International Preliminary Report on Patentability from International Application No. PCT/JP2015/085349, dated Mar. 22, 2016 (in Japanese); English translation dated Jun. 27, 2017.
Office Action dated Dec. 14, 2018 for corresponding Chinese Application No. 201580070241.6 and English Translation, 21 pages.
Japanese Office Action and English Translation issued in corresponding Japanese Application No. 2016-566170, dated Nov. 26, 2019 (9 pages).

* cited by examiner

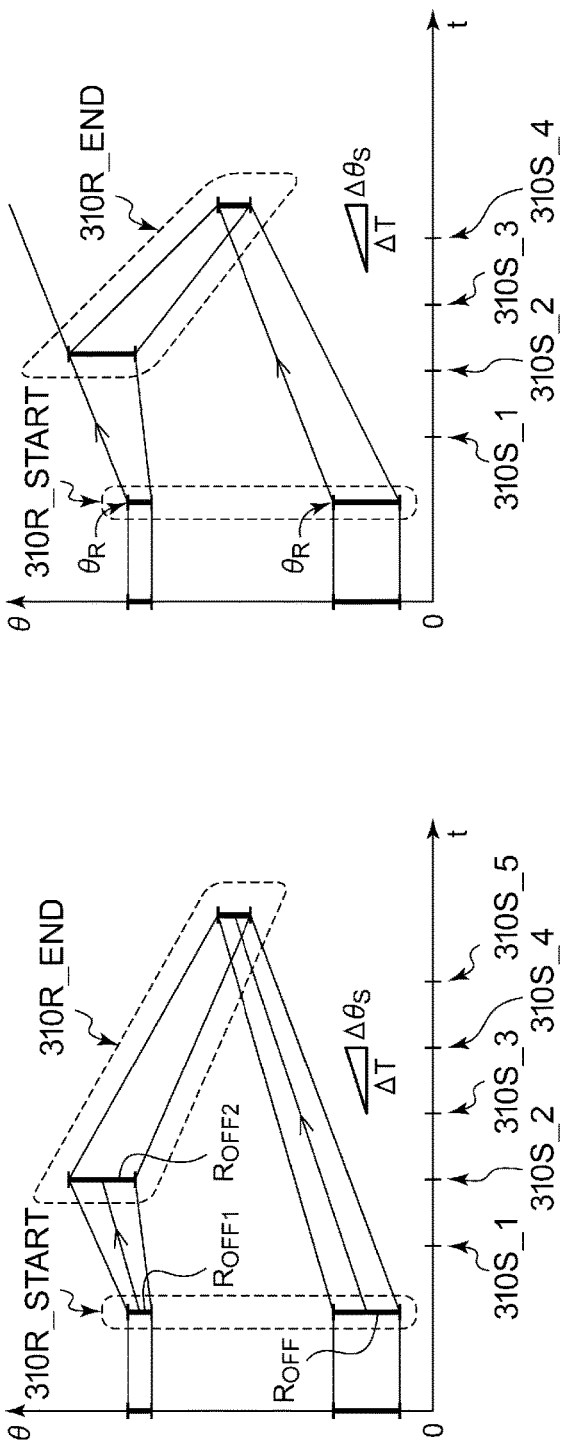

LIGHTING CIRCUIT AND VEHICULAR LIGHTING DEVICE

CROSS-REFERENCE TO RELATED APPLICATIONS

This application is a continuation under 35 U.S.C. § 120 of PCT/JP2015/085349, filed Dec. 17, 2015, which is incorporated herein reference and which claimed priority to Japanese Application No. 2014-262896, filed Dec. 25, 2014, Japanese Application No. 2014-262897, filed Dec. 25, 2014, and Japanese Application No. 2015-180866, filed Sep. 14, 2015. The present application likewise claims priority under 35 U.S.C. § 119 to Japanese Application No. 2014-262896, filed Dec. 25, 2014, Japanese Application No. 2014-262897, filed Dec. 25, 2014, and Japanese Application No. 2015-180866, filed Sep. 14, 2015, the entire content of which are also incorporated herein by reference.

BACKGROUND OF THE INVENTION

1. Field of the Invention

The present invention relates to a vehicular lighting device used for an automobile and the like.

2. Description of the Related Art

Typically, a vehicular lighting device can switch between low beam and high beam. Low beam is for illuminating the vicinity of a vehicle with a predetermined illuminance and is used mainly when traveling in urban areas. There are rules set on light distribution of low beam so as not to give glare to oncoming vehicles or preceding vehicles. Whereas, high beam is for illuminating a wide area in front of a vehicle and faraway areas with relatively high illuminance and is used mainly when traveling a road with few oncoming vehicle or preceding vehicle at high speed. Although high beam gives better visibility to a driver than the low beam does, there is a problem that high beam gives glare to drivers driving vehicles in front or to pedestrians.

In recent years, an adaptive driving beam (ADB) technology has been proposed for dynamically and adaptively controlling a light distribution pattern of high beam based on surrounding conditions of a vehicle. The ADB technology detects the presence of preceding vehicles in front of a vehicle, oncoming vehicles, and pedestrians and dims light for illuminating regions corresponding to the vehicles or pedestrians so as to reduce glare given to the vehicles or pedestrians.

The following technologies have been proposed to achieve ADB functions: that is, a shutter method for controlling an actuator, a rotary method, and an LED array method. In the shutter method and the rotary method, it is possible to continuously vary a width of a light-off region (shaded region), but the number of light-off regions is limited to one. In the LED array method, it is possible to set a plurality of light-off regions, but a width of each light-off region is restricted by an irradiation width of an LED chip so that the light-off regions become discretely distributed.

In order to solve such problems, the present applicants have proposed an example of the ADB technology: that is, a blade scan method (see JP 2012-224317 A). In the blade scan method, light is incident on a rotating reflector (blade), and the incident light is reflected at an angle in accordance with a rotational position of the reflector so that the front of a vehicle is scanned with the reflected light. At the same time, a light source is determined whether to turn on or off and light intensity is varied in accordance with the rotational position of the reflector so that a desired light distribution pattern is formed in front of the vehicle.

SUMMARY OF THE INVENTION

An aspect of the present invention has been made in light of the aforementioned problems, and an exemplary object thereof is to provide a lighting circuit usable for the blade scan method.

As a result of study on a vehicular lighting device having the ADB functions, the present inventors have found the following problems. Instantaneous and discontinuous variation of a light distribution pattern gives a discomfort feeling to a driver or poses a problem for driving due to sudden darkness of a region which has been irradiated until then or sudden shifting of an irradiated region.

An aspect of the present invention has been made in light of the aforementioned problems, and an exemplary object thereof is to provide a lighting circuit that reduces a discomfort feeling given to a driver and/or enhances the safety.

1. An aspect of the present invention relates to a lighting circuit used for a vehicular lighting device. The vehicular lighting device includes a semiconductor light source; and a reflector that receives emitted light of the semiconductor light source and repeats a predetermined periodic motion so as to scan the front of a vehicle with reflected light of the emitted light. The lighting circuit includes a position detector that generates a position detection signal indicating a timing at which a predetermined reference point of the reflector passes a predetermined position; a light intensity calculator that receives information on a light distribution pattern to be formed in front of the vehicle and calculates light intensity to be generated by the semiconductor light source at each time based on the position detection signal; and a driver that lights the semiconductor light source so as to obtain the light intensity calculated by the light intensity calculator at each time.

In this aspect, even when the periodic motion of the reflector is not under the control of the lighting circuit, a position of the reflector at each time is estimated based on the position detection signal so that a region irradiated with the reflected light is estimated based on the position of the reflector. Therefore, according to this aspect, it is possible to constantly vary light intensity of the semiconductor light source in accordance with the change in position of the reflector and to form a desired light distribution pattern.

The lighting circuit may further include a period calculator that calculates a period of the periodic motion of the reflector based on the position detection signal. The light intensity calculator may calculate the light intensity to be generated by the semiconductor light source at each time based on the position detection signal and the period.

According to this aspect, even in a case where the period of the periodic motion of the reflector fluctuates, it is possible to accurately estimate a position of the reflector at each time.

The vehicular lighting device may include a plurality of semiconductor light sources. The light intensity calculator may individually calculate light intensity to be generated by the semiconductor light sources at each time for each of the plurality of semiconductor light sources.

Since an incident angle of light on the reflector differs from one semiconductor light source to another, when the reflector is at a certain position, a region irradiated with the reflected light differs from one semiconductor light source to another. According to this aspect, the region irradiated by the reflected light at each time is individually estimated for each semiconductor light source, and the light intensity of each semiconductor light source is constantly varied in accordance with the change in position of the reflector so that a desired light distribution pattern can be formed.

The plurality of semiconductor light sources may be connected in series. The light intensity calculator may determine whether to turn on or off for each semiconductor light source. The driver may include a converter that supplies drive currents to the plurality of semiconductor light sources; a plurality of bypass switches corresponding to the semiconductor light sources and respectively provided in parallel with the corresponding semiconductor light sources; and a switch controller that controls on-off state of the plurality of bypass switches in accordance with light-on/light-off instructions of the corresponding semiconductor light sources.

Accordingly, it possible to control whether to turn on or off and to vary the light intensity for each irradiated region.

The light intensity calculator may turn off the semiconductor light source when the period is longer than a predetermined threshold.

When the semiconductor light source is turned on in a case where the motional period of the reflector is long, a driver notices a blink of light (also referred to as a flicker). Accordingly, turning off the semiconductor light source prevents a discomfort feeling.

The reflector may be provided with a slit, and the position detector may include a photosensor provided to the back side of the reflector.

Accordingly, the position detector can detect that the slit has passed over the photosensor.

The reflector may be positioned by a motor, and the position detector may generate a position detection signal based on a Hall signal from the motor.

The light intensity calculator may turn off the semiconductor light source when the reflector is at a position where a predetermined range including end portions of the reflector is able to receive the emitted light of the semiconductor light source.

Compared to a central portion of the reflector, the end portions thereof include a reflecting surface having relatively low degree of precision and relatively large scatter and is likely to cause uneven vapor deposition, which leads to problems such as diffusion of light that brings about glare, and difficulty in obtaining a desired light distribution pattern. Not using the end portions for forming a light distribution pattern makes it easier to form a desired light distribution pattern with no glare.

Another aspect of the present invention relates to a vehicular lighting device. The vehicular lighting device includes a semiconductor light source; a reflector that reflects emitted light of the semiconductor light source; a motor that is mounted with the reflector and rotates so as to scan the front of a vehicle with reflected light of the reflector; a motor drive circuit that drives the motor; and a lighting circuit that drives the semiconductor light source. The lighting circuit turns on the semiconductor light source after the motor starts driving and after a rotation frequency of the motor reaches a predetermined minimum rotation frequency.

When the semiconductor light source is turned on while the motional period of the reflector is long, a driver notices a blink of light (also referred to as a flicker). Before the rotation frequency of the motor reaches the minimum rotation frequency at which the driver hardly feels a flicker, turning off the semiconductor light source prevents a discomfort feeling.

The motor drive circuit may drive the motor so that the rotation frequency of the motor in a stopped state reaches the minimum rotation frequency in a time shorter than 0.2 seconds.

Accordingly, in a case of flashing headlights, it possible to blink the semiconductor light source on and off.

The motor drive circuit may turn on the semiconductor light source regardless of the rotation frequency of the motor after a predetermined time longer than 0.2 seconds elapses and after the motor in the stopped state starts driving.

In flashing headlights, a flicker is hardly perceived so that it is possible to put priority on lighting.

2. Another aspect of the present invention also relates to a lighting circuit used for a vehicular lighting device. The vehicular lighting device includes a semiconductor light source; and a reflector that receives emitted light of the semiconductor light source and repeats a predetermined periodic motion so as to scan the front of a vehicle with reflected light of the emitted light. The lighting circuit includes a light intensity calculator that receives information indicating a target light distribution pattern to be formed in front of the vehicle and calculates light intensity to be generated by the semiconductor light source at each time; and a driver that turns on the semiconductor light source so as to obtain the light intensity calculated by the light intensity calculator at each time. When the target light distribution pattern is varied, the light intensity calculator calculates light intensity at each time so as to gradually vary a light distribution pattern with time toward the target light distribution pattern after variation.

According to this aspect, even in a platform imparted with a discontinuously varied target light distribution pattern, it is possible to substantially continuously vary the light distribution pattern with time by the light intensity calculator of the lighting circuit. Therefore, it is possible to reduce a discomfort feeling given to a driver and/or enhances the safety. From another point of view, a necessary operation for the vehicle is to generate the target light distribution pattern, but the vehicular lighting device automatically and gradually varies the light distribution pattern so that it is possible to reduce the load of calculation carried out by the vehicle.

In a case where the target light distribution pattern before variation includes a first region and the target light distribution pattern after variation includes a second region corresponding to the first region, the light intensity calculator may vary the light distribution pattern in such a manner that one end and the other end of the first region substantially simultaneously reach one end and the other end of the second region respectively.

Thus, it is possible to naturally vary the light distribution pattern.

In a case where the target light distribution pattern before variation includes the first region and the target light distribution pattern after variation does not include a region corresponding to the first region, the light intensity calculator may slowly decrease a width of the first region to zero as time proceeds.

Accordingly, it possible to naturally vary the light distribution pattern when an object to be irradiated with light disappears from the front of the vehicle.

The light intensity calculator may decrease the width of the first region by moving both ends of the first region toward a reference coordinate.

When the target light distribution pattern after variation includes the second region and the target light distribution pattern before variation does not include a region corresponding to the second region, the light intensity calculator may slowly increase a width of the second region from zero as time proceeds.

Accordingly, it possible to naturally vary the light distribution pattern when an object to be irradiated with light suddenly appears in front of the vehicle.

The light intensity calculator may increase the width of the second region by moving both ends of the second region in a direction departing from the reference coordinate.

When the target light distribution pattern before variation includes the first region and the target light distribution pattern after variation includes the second region, the light intensity calculator may make the first region and the second region correspond to each other in a case where a distance between the first region and the second region is shorter than a predetermined threshold.

In a case where the distance between the two regions is long, there is a high possibility that objects, within the two regions, which are to be irradiated in front of the vehicle are not identical. In a case where the distance between the two regions is short, there is a high possibility that objects, within the two regions, which are to be irradiated in front of the vehicle are identical. According to this aspect, natural ADB can be achieved.

The distance between the first region and the second region may be defined by a distance between reference coordinates thereof.

Alternatively, when the target light distribution pattern before variation includes the first region and the target light distribution pattern after variation includes the second region, light-distribution-pattern information may include data indicating whether the first region and the second region correspond to each other.

An ECU on the vehicle may discriminate an object irradiated in each region with high accuracy based on information such as a camera, and a vehicle speed. In this case, as the vehicle determines a correspondence relationship between the first and second regions, the accuracy improves.

A transition time of the light distribution pattern may be 0.1 seconds or more and 10 seconds or less.

Accordingly, it is possible to vary the light distribution pattern while reducing a discomfort feeling given to a driver.

When the target light distribution pattern is varied before the light distribution pattern reaches the target light distribution pattern, the light intensity calculator may set a current light distribution pattern at that time to the target light distribution pattern before variation.

Accordingly, when a situation in front of the vehicle changes before the transition of a light distribution pattern is completed, the target light distribution pattern is immediately varied so that the light distribution pattern can be gradually varied to a new target light distribution pattern.

When the target light distribution pattern is varied, the light intensity calculator may vary the light distribution pattern from the target light distribution pattern before variation to the target light distribution pattern after variation over a predetermined transition time.

In this case, the time required for the transition can be made constant without depending on the target light distribution pattern. In addition, when one light distribution pattern includes a plurality of light-off regions (light-on regions), movement of each region can be completed at the same time.

When the target light distribution pattern is varied, the light intensity calculator may vary the light distribution pattern so that a speed of variation of the reference coordinate of each region included in the light distribution pattern is set as a predetermined value.

In this case, when a plurality of regions is included in one light distribution pattern, each region can be moved at the same speed.

The reference coordinate of each region may be the central coordinate of each region. Accordingly, each region can be moved or changed in size without causing a feeling of strangeness.

Alternatively, the left end or the right end of each region may be employed as a reference coordinate. In this case, it is possible to simplify calculation in the light intensity calculator.

The vehicular lighting device may include a plurality of semiconductor light sources. The light intensity calculator may individually determine light intensity to be generated by the semiconductor light sources at each time for each of the plurality of semiconductor light sources.

The reflector may be rotatively controlled by a motor.

Another aspect of the present invention relates to a vehicular lighting device. The vehicular lighting device includes a semiconductor light source; a reflector that receives emitted light of the semiconductor light source and repeats a predetermined periodic motion so as to scan the front of a vehicle with reflected light of the emitted light; and any one of the aforementioned lighting circuits that drives the semiconductor light source.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 13A to 13C are views showing variations of the gradual variation control of light distribution patterns;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the term "a state in which a member A is connected to a member B" involves not only a case where the members A and B are physically directly connected but also a case where the members A and B are indirectly connected with other members involved without substantially affecting electrical connection between the members A and B or without deteriorating functions and effects to be achieved by the connection between the members A and B. Similarly, the term "a state where a member C is provided between the member A and the member B" involves not only a case where the members A and C, or the members B and C are directly connected but also a case where the members A and C, or the members B and C are indirectly connected with other members involved without substantially affecting electrical connection between the members A and C, or the members B and C or without deteriorating functions and effects to be achieved by the connection between the members A and C, or the members B and C.

In the present specification, electric signals such as voltage signals and current signals, or codes applied to a circuit element such as a resistor, and a capacitor are to represent voltage values, current values, resistance values, and capacitance value respectively.

Figure 1:
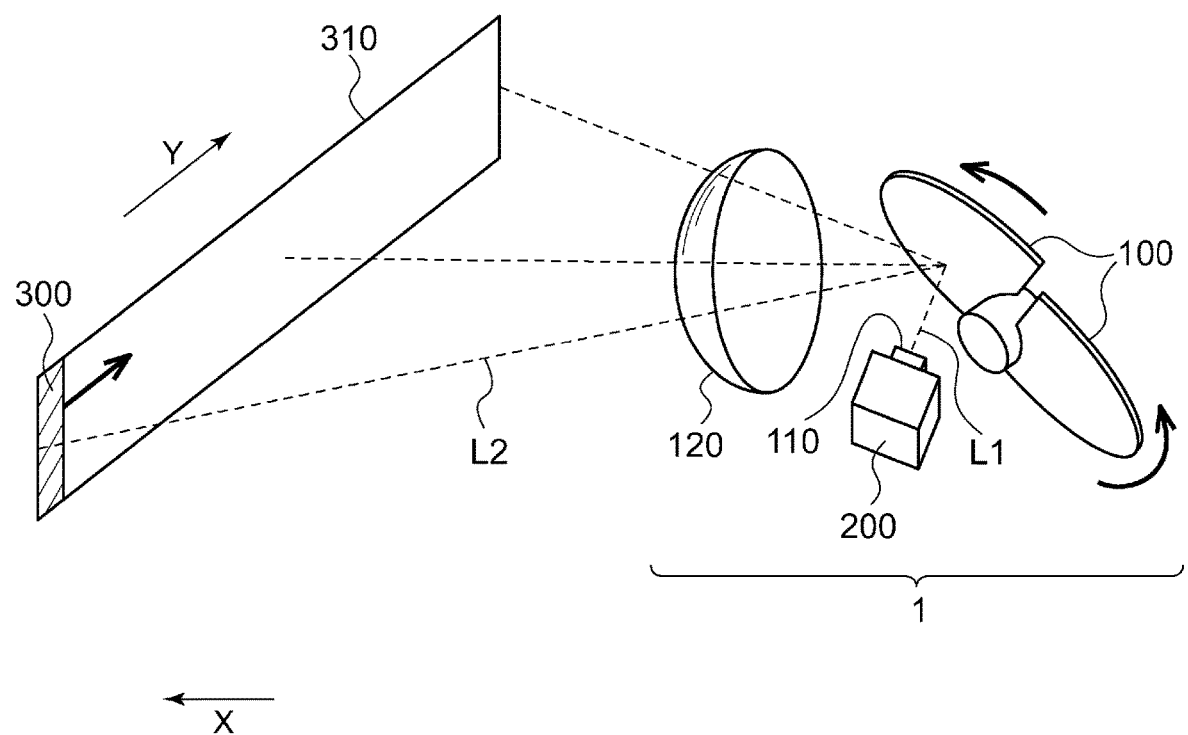
FIG. 1 is a perspective view schematically showing a vehicular lighting device according to an embodiment.

FIG. 1 is a perspective view schematically showing a vehicular lighting device 1 according to an embodiment. The vehicular lighting device 1 shown in FIG. 1 has a blade scan type ADB function, and forms various light distribution patterns in front of a vehicle. The vehicular lighting device 1 mainly includes blades (also referred to as reflecting mirrors or reflectors) 100, a light source 110, a projection lens 120, and a lighting circuit 200. As will be described later, a plurality of light sources 110 may be provided. However, for sake of understandability and simplicity, hereinafter described is a case where one light source 110 is employed.

The light source 110 is a semiconductor light source using a light emitting diode (LED) or a laser diode. Each blade 100 receives emitted light L1 of the light source 110 and repeats a predetermined periodic motion to scan the front of the vehicle in a lateral direction (a Y direction in the drawing) with reflected light L2 of the emitted light L1. In the present embodiment, the blades 100 are mounted on a rotor of a motor (not shown) and carry out a rotary motion. At a certain time, the emitted light L1 of the blades 100 is reflected at a reflection angle depending on positions of the blades 100 (a rotation angle of the rotor) so as to form an irradiated region 300.

As the blades 100 rotate, the reflection angle changes, and the irradiated region 300 is scanned in the Y direction. By repeating this operation at a high speed, for example at 50 Hz or more, a light distribution pattern 310 is formed in front of the vehicle. The lighting circuit 200 controls light intensity (luminance) of the light source 110 in synchronization with the periodic motion of the blades 100 so as to obtain a desired light distribution pattern. A range (region) within the irradiated region 300 which is to be irradiated is referred to as a light-on region $R_{ON}$, and a range (region) within the irradiated region 300 which is not to be irradiated is referred to as a light-off region $R_{OFF}$. The light distribution pattern 310 is a combination of the light-on region $R_{ON}$ and the light-off region $R_{OFF}$.

First Embodiment

Figure 2:
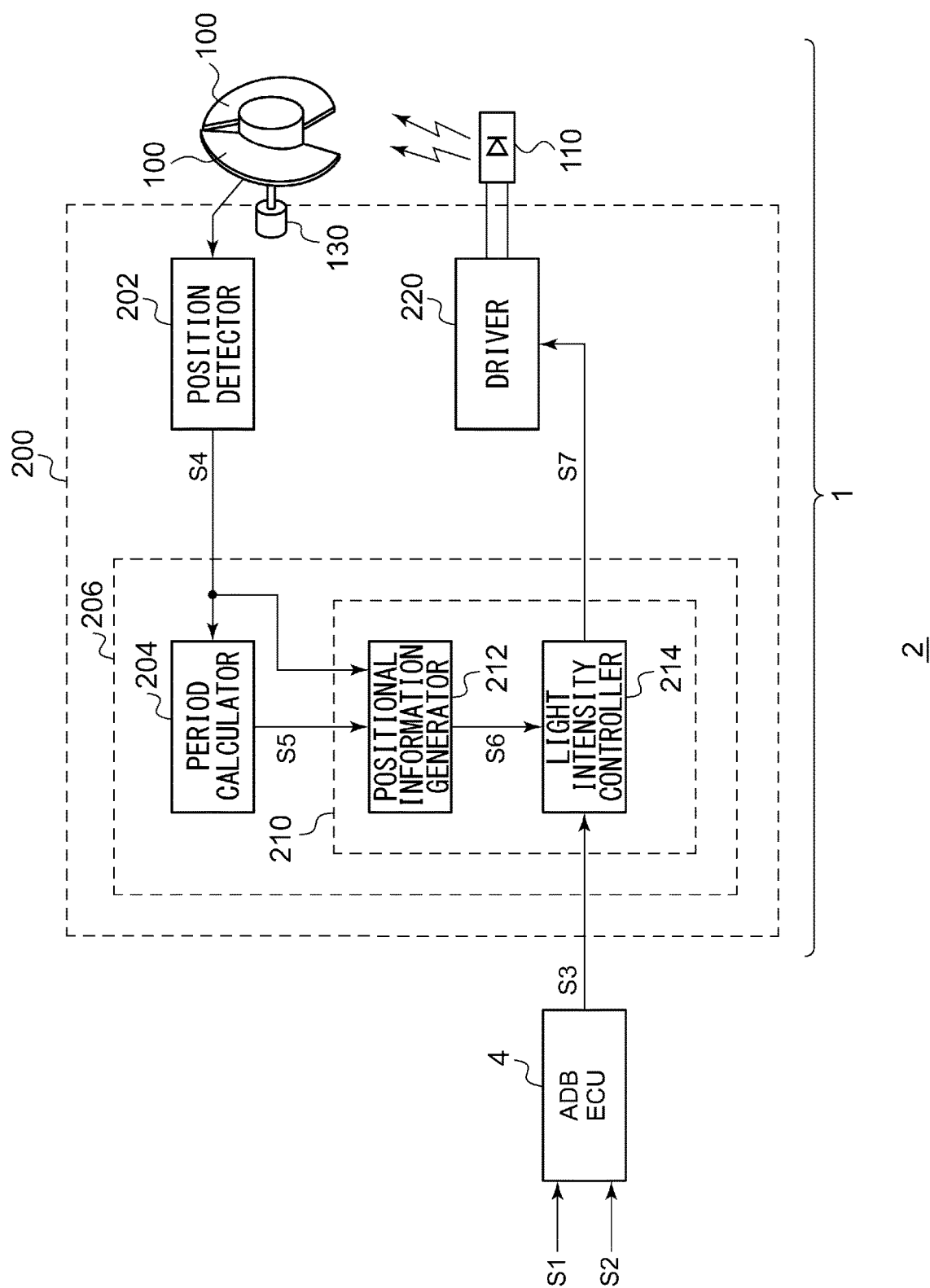
FIG. 2 is a block diagram of a lighting system including a lighting circuit according to a first embodiment.

FIG. 2 is a block diagram of the vehicular lighting device 1 including the lighting circuit 200 according to the first embodiment and of a lighting system 2. The lighting system 2 includes an ADB ECU 4 and the vehicular lighting device 1. The ADB ECU 4 may be mounted on the vehicle or may be incorporated in the vehicular lighting device 1.

The ADB ECU 4 receives camera information S1 and vehicle information S2. Based on the camera information S1, the ADB ECU 4 detects situations in front of the vehicle, specifically, presence or absence of oncoming vehicles, preceding vehicles, and pedestrians. Based on the vehicle information S2, the ADB ECU 4 detects a current vehicle speed, a steering angle, and the like. Based on such information, the ADB ECU 4 determines a light distribution pattern to be irradiated in front of the vehicle, and transmits information indicating the light distribution pattern (light-distribution-pattern information) S3 to the vehicular lighting device 1. For example, the light-distribution-pattern information S3 may include data in which irradiation coordinates in the lateral direction are represented by angles and which indicates a correspondence relationship between each angle and light intensity per angle.

For sake of understandability, light intensity of the light source 110 is controlled, for example, only by turning the light source 110 on and off. In this case, the light-distribution-pattern information S3 may include data indicating the light-off region $R_{OFF}$ of the light distribution pattern 310 to be formed in front of the vehicle. For example, the light-distribution-pattern information S3 may include a set of a coordinate $\theta_L$ indicating the left end of the light-off region $R_{OFF}$ and a coordinate $\theta_R$ indicating the right end thereof. When there is a plurality of light-off regions $R_{OFF}$, plural sets of coordinates $(\theta_L, \theta_R)$ may be included in the light-distribution-pattern information S3. Alternatively, the light-distribution-pattern information S3 may include a set of a central coordinate $\theta_C$ of the light-off region $R_{OFF}$ and a width $\Delta\theta$ of the light-off region $R_{OFF}$, or may include a set of a left end coordinate $\theta_L$ (or a right end coordinate $\theta_R$) of the light-off region $R_{OFF}$ and the width $\Delta\theta$ of the light-off region $R_{OFF}$.

Reversely, the light-distribution-pattern information S3 may include data indicating the light-on region $R_{ON}$ instead of the data indicating the light-off region $R_{OFF}$, or may include both.

The lighting circuit 200 controls the light intensity (luminance) of the light source 110 in synchronization with the rotation of the blades 100 based on the light-distributionpattern information S3. The lighting circuit 200 includes a position detector 202, a period calculator 204, a light intensity calculator 210, and a driver 220. The period calculator 204 and the light intensity calculator 210 are referred to as a lighting device ECU 206. The lighting device ECU 206 includes a microcontroller, a microprocessor, or an application specified IC (ASIC).

The position detector 202 generates a position detection signal S4 indicating a timing at which predetermined reference points of the blades 100 pass a predetermined position. For example, the reference point may be end portions (a separator line) of two blades 100, the center of each blade, or any other points.

A Hall element may be mounted on a motor 130 that rotates the blades 100. In this case, a Hall signal from the Hall element turns into a periodic waveform corresponding to a position of the rotor, that is, positions of the blades 100 (hereinafter referred to as a blade coordinate). The position detector 202 may detect a timing when polarity of the Hall signal inverts. Specifically, the position detector 202 may include a Hall comparator for comparing a pair of Hall signals. The Hall element may be mounted on any position.

Based on the position detection signal S4 from the position detector 202, the period calculator 204 calculates a period Tp of the periodic motion of the blades 100. For example, when the position detection signal S4 is an output of the Hall comparator, the period calculator 204 measures an interval (half period) between edges of the position detection signal S4. The period calculator 204 includes a counter that counts the interval between the edges with a clock signal. The period calculator 204 outputs period information S5 indicating the measured period.

The light intensity calculator 210 receives the light-distribution-pattern information S3 and calculates light intensity to be generated by the light source 110 at each time based on the period Tp indicated by the position detection signal S4 and the period information S5.

For example, the light intensity calculator 210 includes a microcontroller, a microprocessor, a digital signal processor (DSP), a central processing unit (CPU), and an application specified IC (ASIC), containing function blocks referred to as a positional information generator 212 and a light intensity controller 214.

Based on the period information S5 and the position detection signal S4, the positional information generator 212 generates positional information S6 indicating positions of the blades 100 at each time. For example, the positional information generator 212 may include a counter which is reset per edge of the position detection signal S4 and which counts up (or counts down) every unit time obtained by dividing the period Tp into N (N is an integer).

Based on the light-distribution-pattern information S3 and the positional information S6, the light intensity controller 214 calculates target light intensity of (turning on and off) the light source 110 at each time so as to generate a light intensity command value S7 indicating the target light intensity.

A correspondence relationship between a blade coordinate X (that is, the positional information S6) and an irradiation coordinate θ can be derived from a relationship of geometrical arrangement between the light source 110 and the blades 100. The light intensity controller 214 may include a table that contains the correspondence relationship between the positional information S6 and the irradiation coordinate θ, or may hold an arithmetic expression that describes the correspondence relationship between them.

The light intensity controller 214 may convert data $θ_L$, $θ_R$ described by the irradiation coordinate θ included in the light-distribution-pattern information S3 into blade coordinate data $X_L$, $X_R$ so as to determine light intensity at each time. Alternatively, the light intensity controller 214 may convert the blade coordinate X indicated by the positional information S6 into the irradiation coordinate θ so as to determine light intensity at each time.

When the period Tp is longer than a predetermined threshold, that is, when a rotation frequency of the motor 130 is lower than a predetermined value, the light intensity calculator 210 preferably turns off the light source 110. In switching the light source 110 from off to on, it is preferable that the light intensity calculator 210 does not turn on the light source 110 while the rotation frequency of the motor 130 is lower than the predetermined value. When the light source 110 is turned on in a case where the motional period Tp of the blades 100 is long, a driver notices a blink of light (also referred to as a flicker). In such a situation, turning off the light source 110 prevents a discomfort feeling.

For example, when a scanning period of the irradiated region 300 is 50 Hz or less, the light source 110 may be turned off. It is empirically known that a flicker is perceived by human eyes under 50 Hz. In a case where two blades 100 are used, a flicker may not be perceived as long as the rotation frequency of the motor 130 is 1500 rpm or more.

The driver 220 receives the light intensity command value S7 and turns on the light source 110 so as to obtain the light intensity calculated by the light intensity calculator 210 at each time.

The above is the configurations of the lighting circuit 200 and the vehicular lighting device 1 including the same. Hereinafter described are operations of the lighting circuit 200 and the vehicular lighting device 1.

Figure 3:
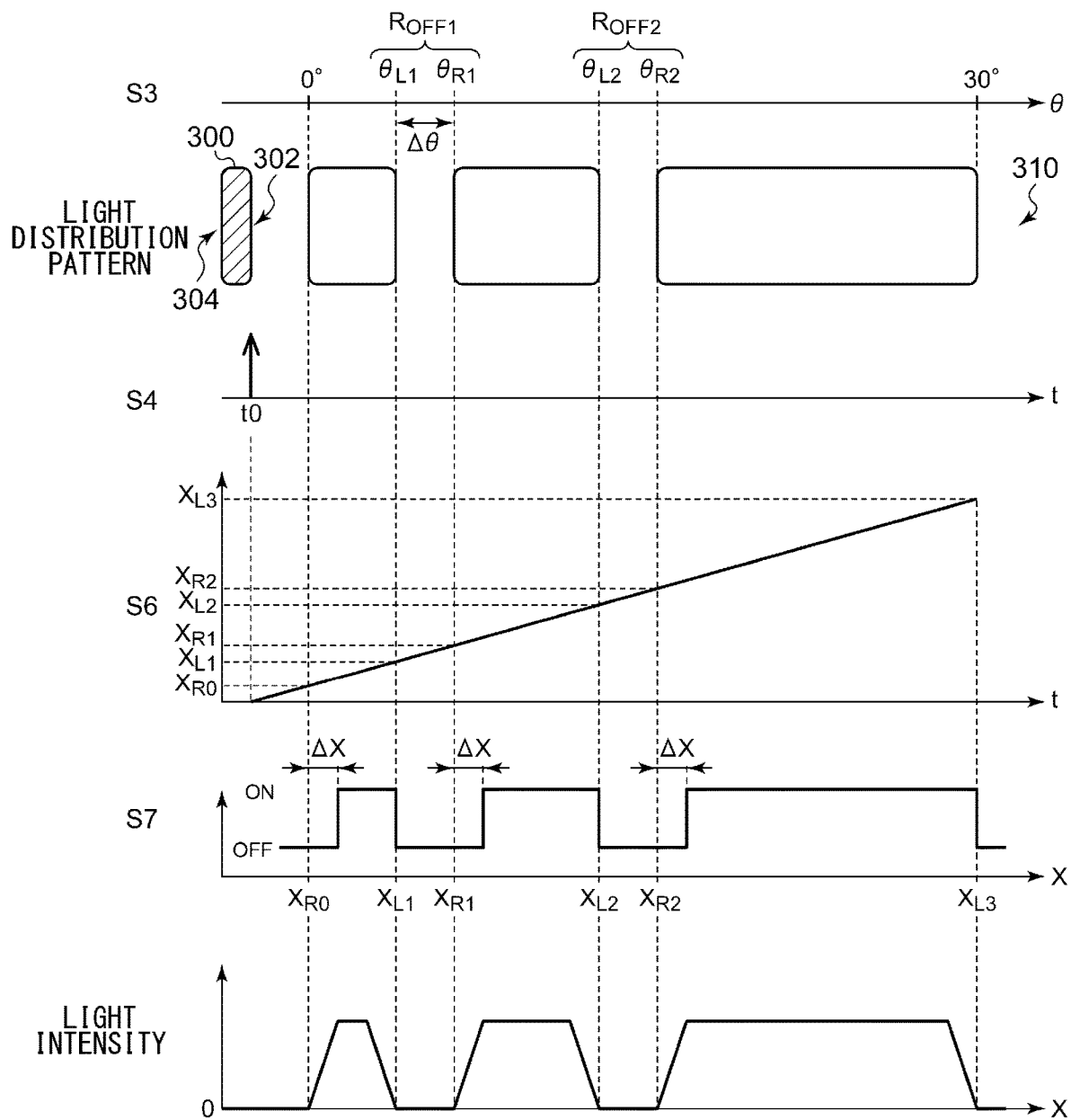
FIG. 3 is a view for describing an operation of the lighting circuit shown in FIG. 2.

FIG. 3 is a view for describing the operation of the lighting circuit 200 shown in FIG. 2. The irradiation coordinate θ, the blade coordinate X, and the time t are taken along the abscissa and are in a one-to-one relationship. In the light distribution pattern 310, the irradiation coordinate θ is defined in a range from 0 to 30 degrees. What is shown herein is a case where two light-off regions $R_{OFF1}$, $R_{OFF2}$ are formed.

The irradiated region 300 represents a portion irradiated by one light source 110 when the blades 100 are at a stop at a certain position. As the blades 100 rotate over time, the irradiated region 300 is scanned in a direction in which the irradiation coordinate θ increases (or in the opposite direction). One side of the irradiated region 300 in a scanning direction is referred to as a leading edge 302, and the opposite side is referred to as a trailing edge 304. Herein, light intensity is controlled on the basis of a coordinate of the leading edge 302.

The motor 130 that positions the blades 100 rotates at a predetermined rotation frequency. For example, the motor 130 rotates at 3600 rpm. However, it should be noted that the rotation frequency of the motor 130 cannot be kept perfectly constant and that the rotation of the motor 130 is not under the control of the lighting device ECU 206 but is in a free running state and that the lighting device ECU 206 controls the light source 110 while adapting to the state of the motor 130 (blades 100).

When the position detection signal S4 is asserted at a certain time t0, the time is made to correspond to a reference value (for example, 0) of the blade coordinate X, and then a value of the positional information S6 indicating positions of the blades 100 increases as time proceeds. In other words, the time t and the positional information S6 are in a one-to-one relationship. The period Tp of the position detection signal S4 calculated just before determines an inclination.

The left end coordinate $\theta_L$ and the right end coordinate $\theta_R$ of each of the light-off regions $R_{OFF1}$, $R_{OFF2}$ are converted into data $X_L$, $X_R$ of the blade coordinate X. The light intensity controller 214 generates the light intensity command value S7 in such manner that light intensity in each of the light-off regions $R_{OFF1}$, $R_{OFF2}$ becomes zero.

As shown in FIG. 3, a timing when the light intensity command value S7 is switched from off-state to on-state is shifted from each light-off region $R_{OFF}$ by ΔX. The symbol ΔX is a width of the irradiated region 300. Here are the reasons. In the blade scan method, since a light distribution pattern is formed by scanning the irradiated region 300, the light distribution pattern 310 is given by an integrated value of the irradiated region 300. Accordingly, if switching from off-state to on-state based on the coordinate of the leading edge 302, the light-off region $R_{OFF}$ is irradiated with light. Therefore, the light intensity controller 214 switches the light source 110 from on-state to off-state when the coordinate of the leading edge 302 reaches a start end (a terminal end of the light-on region $R_{ON}$) $X_L$ of the light-off region $R_{OFF}$. Furthermore, when the coordinate of the trailing edge 304 reaches a terminal end $X_R$ of the light-off region $R_{OFF}$ (a start end of the light-on region $R_{ON}$), that is, when the coordinate of the leading edge 302 reaches $X_R$+ΔX, it is desirable that the light intensity controller 214 switches the light source 110 from off-state to on-state. Accordingly, the light-off region $R_{OFF}$ can be darkened.

The above is the operation of the lighting circuit 200.

According to the lighting circuit 200, even when the periodic motion of the blades 100 is not under the control of the lighting circuit 200, positions of the blades 100 at each time can be estimated based on the period Tp of the blades 100 and the position detection signal S4. Based on the estimated positions of the blades 100, a position of the irradiated region 300 of the reflected light can be estimated. Therefore, in accordance with change in positions of the blades 100, light intensity of the light source 110 can be varied every moment and a desired light distribution pattern can be formed.

Figure 4:
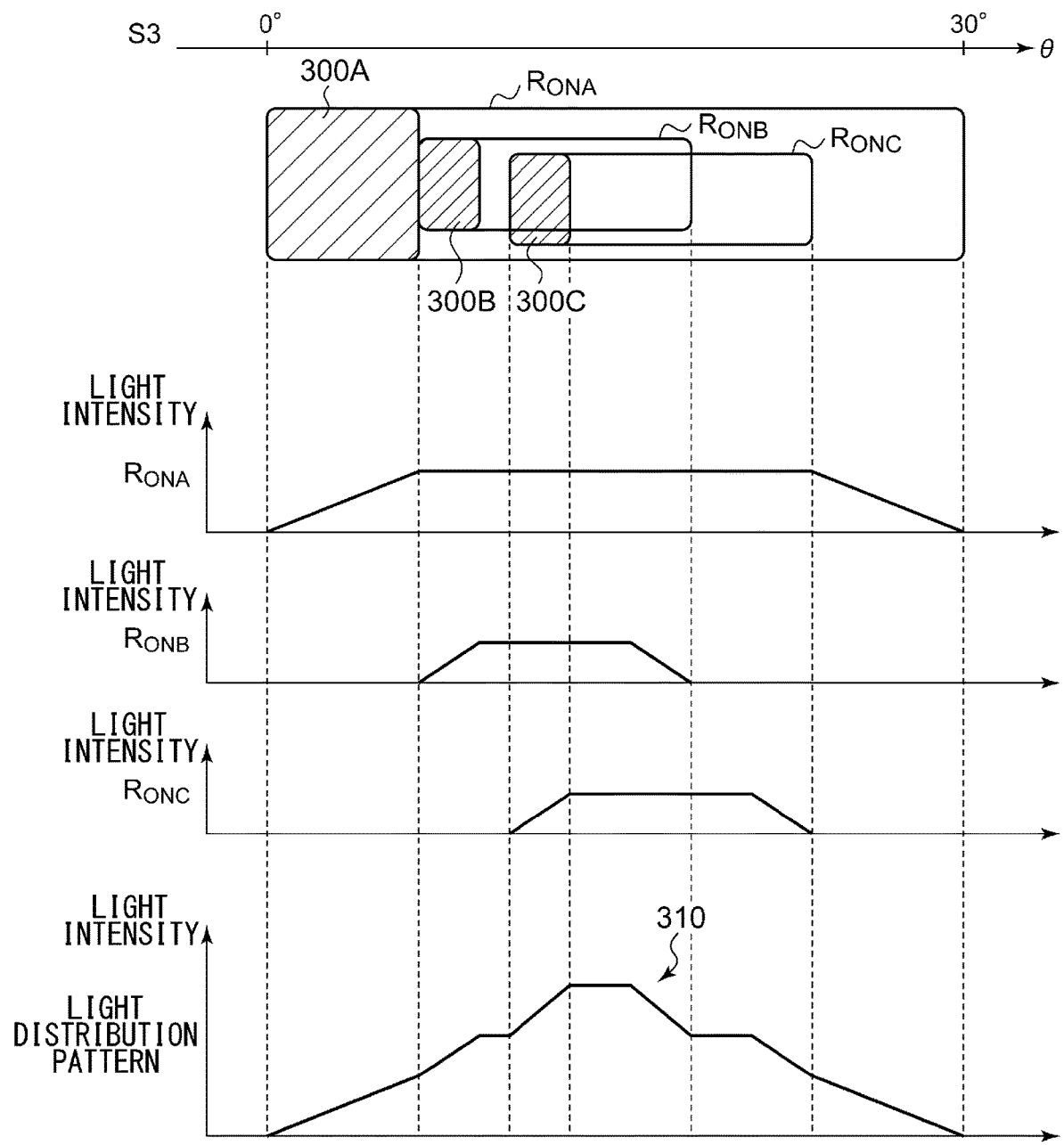
FIG. 4 is a view for describing a light distribution pattern of the lighting circuit when employing a plurality of light sources.

What has been described above is a case where one light source 110 is used, but using a plurality of light sources 110 is also applicable. FIG. 4 is a view for describing the light distribution pattern 310 of the lighting circuit 200 when employing a plurality of light sources 110. Herein, three light sources 110A to 110C are employed, and irradiated regions thereof are shown as 300A to 300C respectively.

FIG. 4 shows the irradiated regions 300A to 300C at a certain time. It is impossible to lay out the plurality of light sources 110 at exactly the same position and each light sources 110 has an incident angle on the blades 100 different from each other. Therefore, the plurality of light sources 110A to 110C form different irradiated regions 300A to 300C.

Furthermore, the light sources 110A to 110C independently form a light-on region $R_{ON}$ (light-off region $R_{OFF}$). Light intensity of the finally formed light distribution pattern 310 is a superposition of each light-on region $R_{ON}$ (light-off region $R_{OFF}$). By employing the plurality of light sources 110 in this manner, it is possible to form a multiple tone light distribution pattern 310 only by controlling on-off state of each light source 110.

Figure 5:
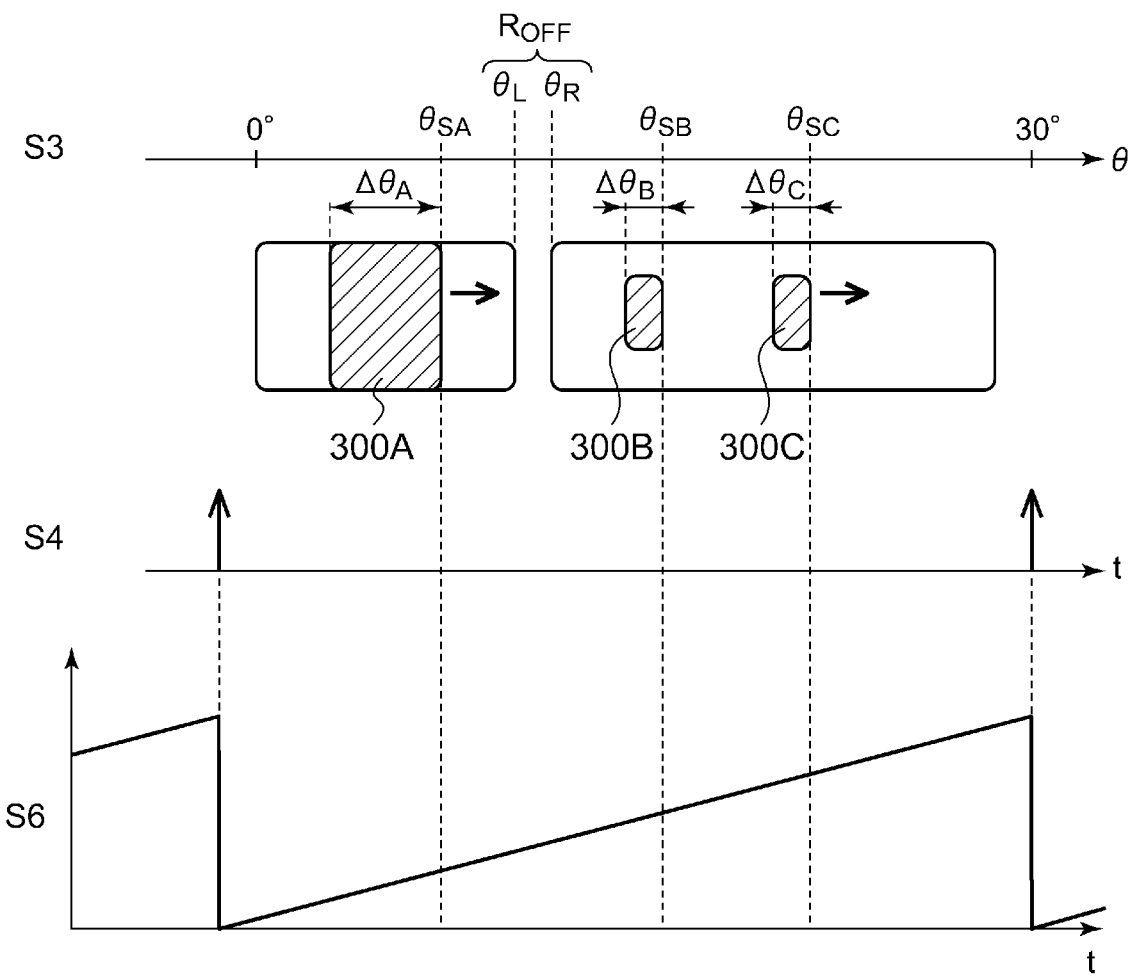
FIG. 5 is a view for describing on-off control of the plurality of light sources.
Figure 6:
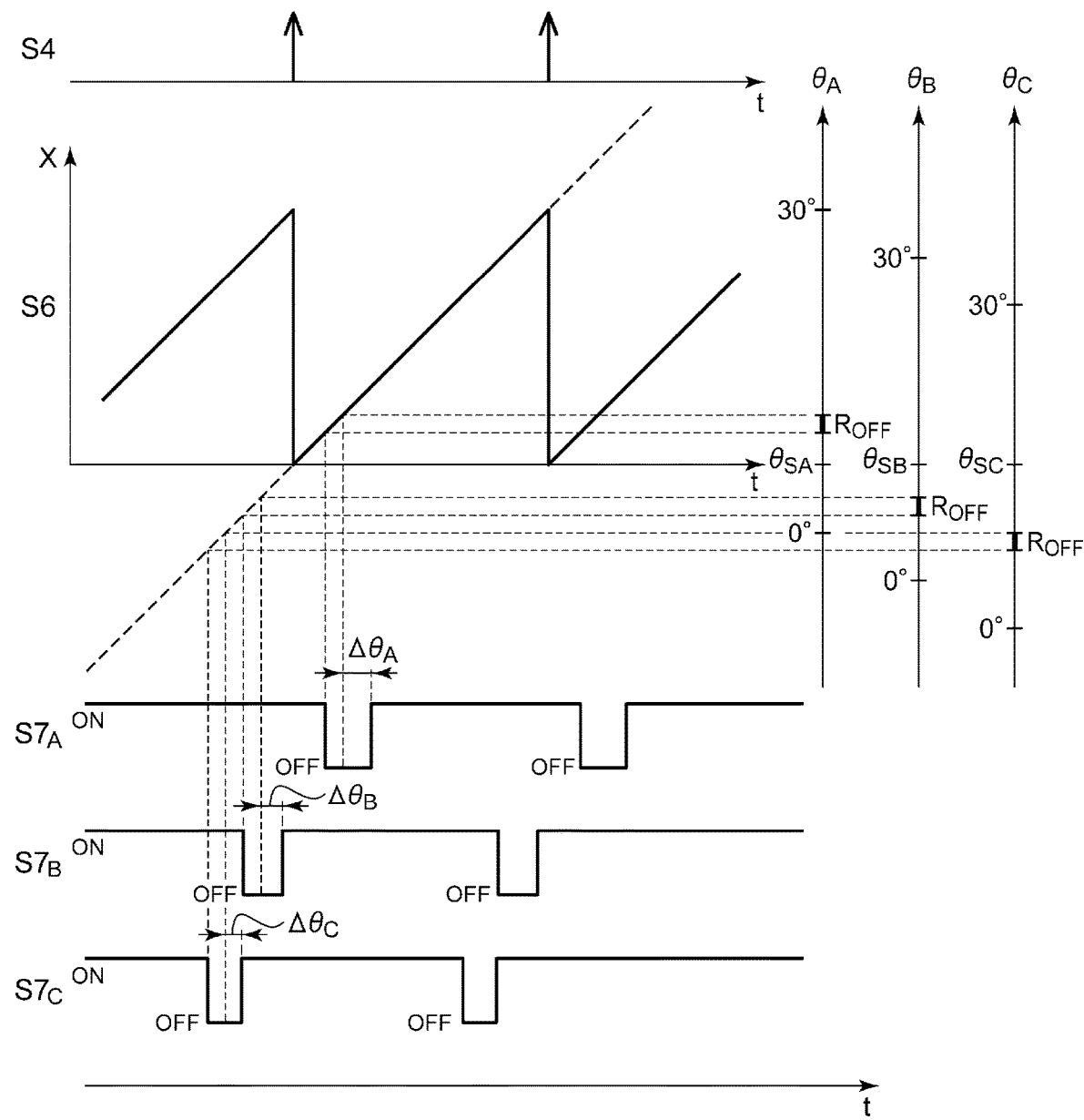
FIG. 6 is a view for describing on-off control of the plurality of light sources.

Hereinafter described is on-off control of the plurality of light sources 110. FIGS. 5 and 6 are views for describing on-off control of the plurality of light sources 110.

As described above, since the plurality of light sources 110A to 110C form different irradiated regions 300A to 300C, a relationship between a blade coordinate X and an irradiation coordinate θ is different from one light source 110 to another. Therefore, for each light source 110, the light intensity controller 214 may include a table that contains a correspondence relationship between the positional information S6 (blade coordinate) and the irradiation coordinate θ, or may hold an arithmetic expression that describes the correspondence relationship between them. The light-distribution-pattern information S3 may include data specifying a light-on region $R_{ON}$ (light-off region $R_{OFF}$) shared by the light sources 110, or may include data specifying an individual light-on region $R_{ON}$ (light-off region $R_{OFF}$) for each light source 110.

In regard to a timing of an edge of the position detection signal S4, that is, at a time when the positional information S6 is set to a reference value (for example, zero), the irradiated regions 300A to 300C are assumed to be located at the illustrated coordinates. Irradiation coordinates of leading edges of the irradiated regions 300A to 300C at this time are set to $\theta_{SA}$ to $\theta_{SC}$ respectively.

Refer to FIG. 6. The positional information S6 is repeatedly generated in synchronization with the timing of the edge of the position detection signal S4. FIG. 6 shows the relationship between the positional information S6 and irradiation coordinates $\theta_A$ to $\theta_C$ of each light source 110. At the timing when the position detection signal S4 is asserted, the irradiation coordinates $\theta_A$ to $\theta_C$ are $\theta_{SA}$ to $\theta_{SC}$.

The light intensity controller 214 individually controls light intensity of the light sources 110A to 110C and generates light intensity command values $S7_A$ to $S7_C$ for each of the light sources 110A to 110C.

In regard to the light source 110A, the light intensity command value $S7_A$ is set to an off level (light-off) while the positional information S6 indicates a blade coordinate X corresponding to a light-off region $R_{OFF}$ of the irradiation coordinate $\theta_A$. Similarly, in regard to the light source 110B, while the positional information S6 indicates a blade coordinate X corresponding to a light-off region $R_{OFF}$ of the irradiation coordinate $\theta_B$, the light intensity command value $S7_B$ is set to the off level (light-off). In regard to the light source 110C, the light intensity command value $S7_C$ is set in a similar manner.

According to the lighting circuit 200, the irradiated regions 300A to 300C of the reflected light at each time are individually estimated for each light source 110, and the light intensity of each light source 110 is constantly varied in accordance with the change in positions of the blades 100 so that a desired light distribution pattern can be formed.

What has been shown herein is a case where the positional information S6 (blade coordinate) is shared by the plurality of light sources 110A to 110C. However, when there are sufficient hardware resources, the positional information S6 may be generated individually for each light source 110.

Figure 7:
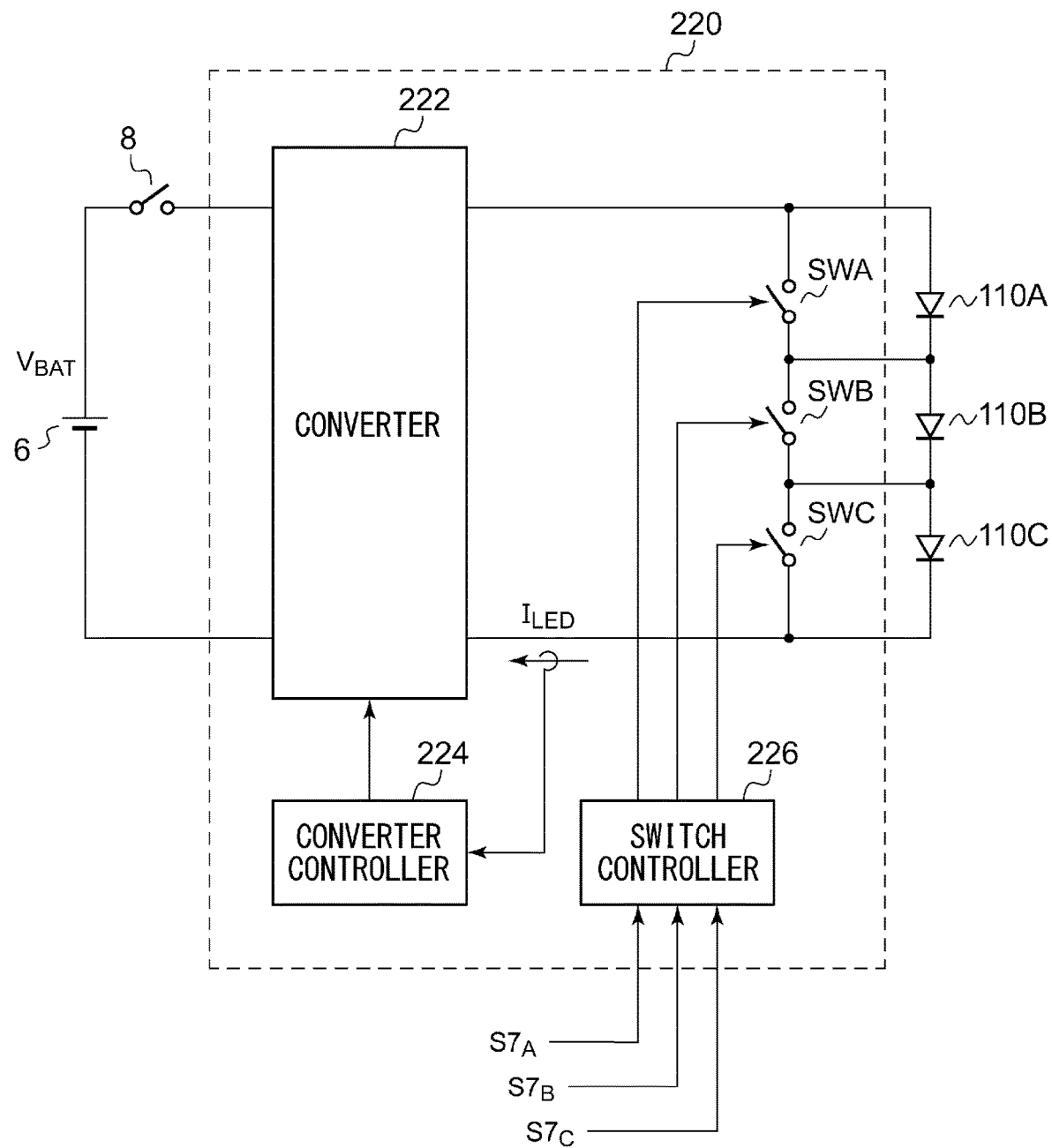
FIG. 7 is a circuit diagram of a driver that drives the plurality of light sources.

FIG. 7 is a circuit diagram of the driver 220 that drives the plurality of light sources 110.

The plurality of light sources 110A to 110C are connected in series. Each light source 110 may include a plurality of LEDs connected in series. Furthermore, the number of LEDs may be different from one light source 110 to another.

The driver 220 includes a converter 222, a converter controller 224, a plurality of bypass switches SWA to SWC, and a switch controller 226. A battery voltage $V_{BAT}$ from a battery 6 is supplied to the converter 222 through a switch 8. The converter 222 supplies drive currents $I_{LED}$ corresponding to target luminance to the light sources 110. The converter controller 224 may detect the drive currents $I_{LED}$ and carry out feedback control on a switch duty ratio or a frequency of the converter 222 so that a current detection value approaches a target value. In order to achieve high-speed control, such an operation may be repeated that the converter controller 224 turns off a switching device of the converter 222 when the current detection value reaches an upper threshold set close to the target value, and turns off the switching device when the current detection value decreases to a lower threshold set close to the target value. This is also called hysteresis control.

For example, the converter 222 is a step-up type, a step-down type, or a buck-boost type converter. Preferably, a Cuk type converter is employed as the converter 222. The topology of the Cuk converter is well known so that its explanation will be omitted.

The plurality of bypass switches SWA to SWC correspond to the light sources 110A to 110C. Each bypass switch SW is provided in parallel with the corresponding light source 110. Each bypass switch SW is provided to turn on and off the corresponding light source 110. For example, when the bypass switch SWA is turned on, a drive current $I_{LED}$ does not flow into the light source 110A so that the light source 110A is turned off.

The switch controller 226 controls each on-off state of the plurality of bypass switches SWA to SWC based on light-on/light-off instructions (that is, the light intensity command values $S7_A$ to $S7_C$) of the corresponding light sources 110A to 110C.

The above is the configuration of the driver 220.

In the blade scan type ADB control, it is necessary to control light intensity of each light source 110 at high speed with a short period. With the bypass switches SW, preferable ADB control can be achieved in this method.

Figure 8:
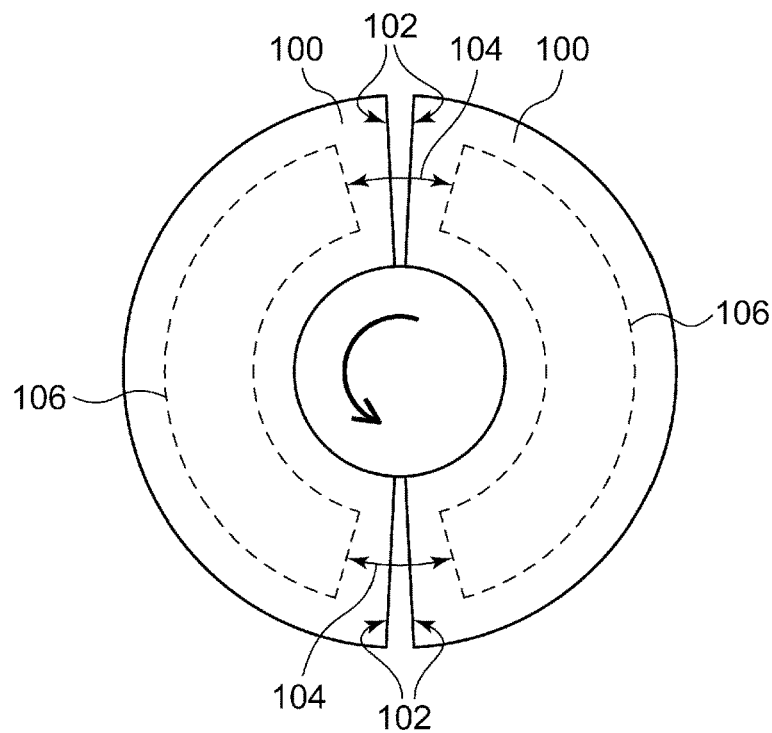
FIG. 8 is a front view of blades.

FIG. 8 is a front view of the blades 100. Compared to a central portion of each blade 100, end portions 102 and the vicinity thereof include a reflecting surface having relatively large scatter in precision and is likely to cause uneven vapor deposition, which leads to problems such as diffusion of light that brings about glare, and difficulty in obtaining a desired light distribution pattern. In view of this problem, it is desirable to design the vehicular lighting device 1 in such a manner that the end portions 102 of each blade 100 and the vicinity of the end portions 102 are not used for forming the light distribution pattern 310. In other words, it is desirable to design an optical axis of each light source 110, orientation of the blades 100, and an optical system including the projection lens 120, using part of or the whole effective region 106 surrounded by a broken line so as to cover a predetermined irradiation coordinate (0 to 30°).

When the blades 100 are at positions where predetermined ranges 104 including the end portions 102 of each blade 100 can receive emitted light from the light sources 110, the light intensity calculator 210 turns off the light sources 110. This makes it easy to form a desired light distribution pattern with no glare.

The first embodiment has been described for illustration purpose and it is prominent to those skilled in the art that combinations of each structural element or each process can be modified variously and that such modifications are also within the range of the present invention. Modifications of the first embodiment will hereinafter be described.

First Modification

A method of detecting positions of the blades 100 by the position detector 202 is not limited to one using a Hall element. For example, the position detector 202 may generate the position detection signal S4 by a rotary encoder of an optical type that detects a position of the rotor of the motor 130 or by a rotary encoder of another type. Alternatively, the position detector 202 may include a photosensor provided to the back side of the blades 100; and a light source for position detection that irradiates light from a surface of the blades 100 toward the photosensor. The blades 100 may be provided with a slit or pinhole. Accordingly, a timing at which the slit or pinhole passes over the photosensor can be detected. The slit may be a gap between the two blades 100 as shown in FIG. 8. Examples of the light source for position detection include an infrared light source, and the light source 110. As mentioned above, there are numerous variations in configuration of the position detector 202.

Second Modification

What has been described in the embodiment is a case where two blades 100 are employed, but the number of blades is not limited thereto. There may one blade or may be three or more blades. Furthermore, the blades 100 have been described in the embodiment that they are configured to rotate, but the blades 100 may be configured to reciprocate.

Third Modification

What has been described in the embodiment is a case where the light source 110 is turned on and off so as to control light intensity of the light source 110. However, light intensity may also be controlled continuously in accordance with an irradiation coordinate.

Fourth Modification

What has been described in the embodiment is a case where the period Tp is measured by the period calculator 204, but the present invention is not limited thereto. A predetermined value may be used as a motional period Tp of the blades 100 in a platform in which the rotation frequency of the motor 130 is reliably constant. Alternatively, in a case where the lighting device ECU 206 controls the rotation frequency of the motor 130, the lighting device ECU 206 can directly learn the period Tp.

Fifth Modification

What has been described in the embodiment is a case where the light source 110 is turned on and off so as to control light intensity of the light source 110. However, light intensity may also be controlled continuously in accordance with an irradiation coordinate.

Sixth Modification

Examples of the light source 110 include not only LED but also a semiconductor light source such as a laser diode (LD), and an organic electroluminescence (EL).

Seventh Modification

The converter 222 has been described in the embodiment that it includes a Cuk converter, but the present invention is not limited thereto. For example, the converter 222 may be a step-down converter (buck converter), and the step-down converter may be controlled by the converter controller 224.

In this case, a flyback type or a forward type buck-boost converter that receives a battery voltage $V_{BAT}$ may be inserted in a stage in front of the step-down converter.

Second Embodiment

Figure 9:
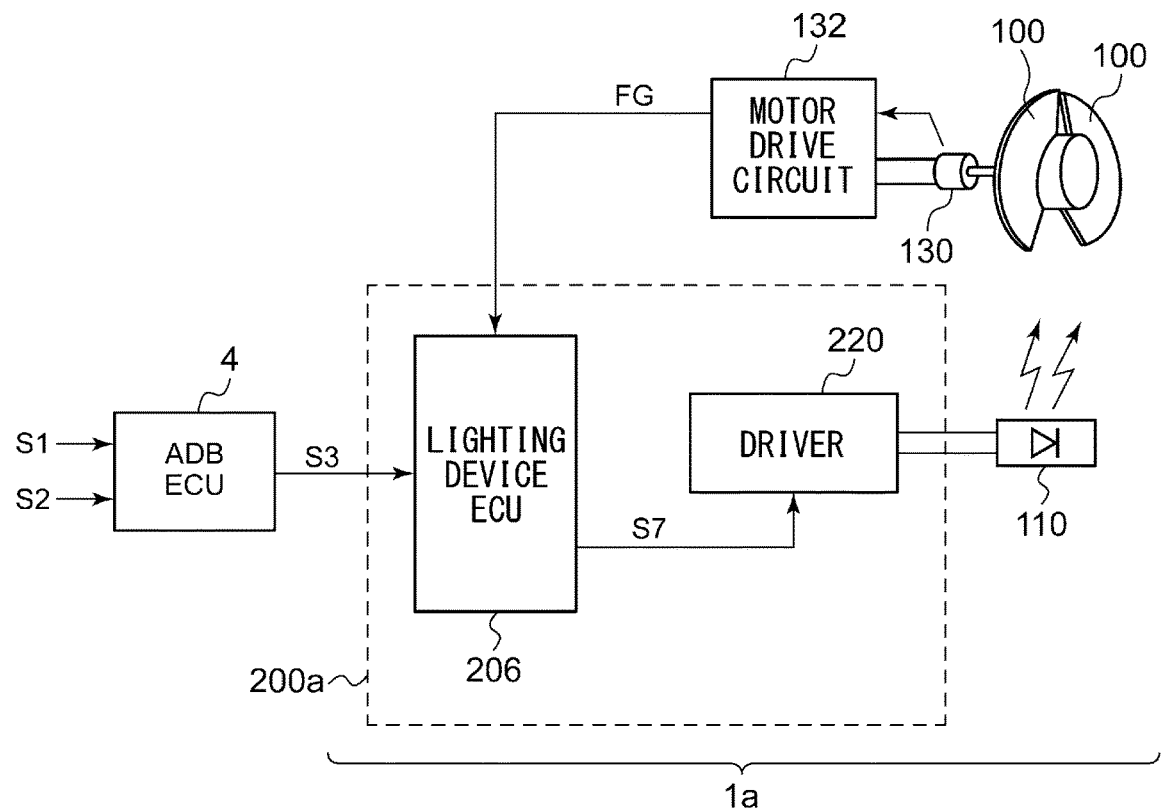
FIG. 9 is a block diagram of a vehicular lighting device according to a second embodiment.

Hereinafter described are rotation control of a motor 130 and on-off control of a light source 110. FIG. 9 is a block diagram of a vehicular lighting device 1a according to a second embodiment.

The vehicular lighting device 1a includes the light source 110, blades 100, the motor 130, a motor drive circuit 132, and a lighting circuit 200a. The blades 100 are reflectors that reflect emitted light of the light source 110, and the blades 100 are mounted on the motor 130. As the motor 130 rotates, the front of a vehicle is scanned with reflected light of the blades 100. An example of the motor 130 includes a brushless DC motor. The motor drive circuit 132 drives the motor 130. An example of the motor drive circuit 132 includes a commercially available motor drive IC. The lighting circuit 200a supplies a drive current to the light source 110 and turns on the light source 110.

Herein, the motor drive circuit 132 rotates the motor 130 when instructed to turn on the light source 110. After the motor 130 starts driving and after a rotation frequency of the motor 130 reaches a predetermined minimum rotation frequency, the lighting circuit 200a turns on the light source 110. Similar to the lighting circuit 200 shown in FIG. 2, the lighting circuit 200a may include a lighting device ECU 206 and a driver 220. The lighting device ECU 206 can be configured in a similar manner as in FIG. 2, but it is not limited thereto.

Most motor drive circuits 132 output a frequency generation (FG) signal having a frequency proportional to the rotation frequency of the motor 130. For example, the motor drive circuit 132 includes a Hall comparator that compares a pair of Hall signals output from a Hall element (not shown), and is configured to output an FG signal in accordance with a rectangular signal output from the Hall comparator. The lighting circuit 200a may monitor the FG signal and measure a period of the FG signal so as to detect the rotation frequency of the motor 130. Alternatively, the lighting circuit 200a may detect the rotation frequency of the motor 130 by monitoring the rectangular signal from the Hall comparator. Alternatively, the lighting circuit 200a may incorporate the Hall comparator.

When a scanning frequency of beam falls below 50 to 60 Hz, people perceive a flicker. In the lighting device provided with two blades 100 mounted on the motor 130, it is desirable to set the minimum rotation frequency from 1500 to 1800 rpm or higher.

In flashing headlights, a lighting time is typically about 0.2 to 1 second. Therefore, the motor drive circuit 132 drives the motor 130 so that the rotation frequency of the motor 130 in a stopped state reaches the minimum rotation frequency in a time shorter than 0.2 seconds. The time until reaching the minimum rotation frequency is referred as a startup time $T_{START}$. In other words, what is selected is a combination of the motor 130 and the motor drive circuit 132 which makes $T_{START}<0.2$ seconds. Accordingly, it is possible to reliably blink the light source on and off in flashing headlights.

Figure 10:
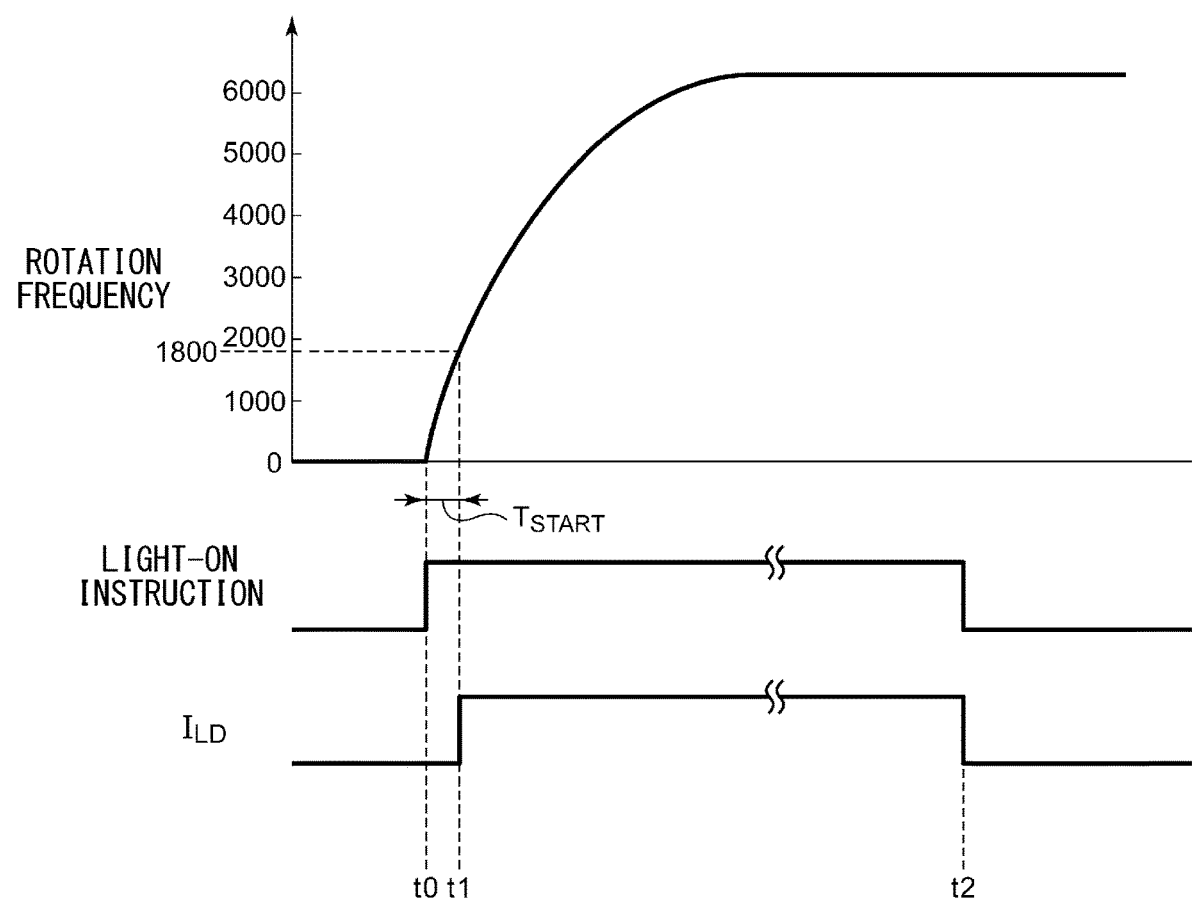
FIG. 10 is a view for describing an operating waveform of the vehicular lighting device shown in FIG. 9.

FIG. 10 is a view for describing an operating waveform of the vehicular lighting device 1a shown in FIG. 9. At a time to, an ADB ECU 4 instructs to light up. In response to this, the motor drive circuit 132 starts driving the motor 130. After a lapse of the startup time $T_{START}$, when the rotation frequency of the motor 130 reaches the minimum rotation frequency (for example, 1800 rpm) at a time t1, the lighting device ECU 206 instructs the driver 220 to light up. Accordingly, a drive current $I_{LD}$ is supplied to the light source 110, and the light source 110 is turned on. The drive current $I_{LD}$ after the time t1 is shown as being constant. Actually, it may have a waveform corresponding to the light-distribution-pattern information S3 as shown in FIG. 3.

The above is the operation of the vehicular lighting device 1a. According to the vehicular lighting device 1a, it is possible to prevent a discomfort feeling by turning off the motor 130 before the rotation frequency of the motor 130 reaches the minimum rotation frequency at which a driver hardly feels a flicker.

As a design policy of a vehicle, priority may be put on lighting rather than preventing a flicker due to low rotation. In this case, after the motor drive circuit 132 starts driving the motor 130 in the stopped state and after a lapse of a predetermined time (forced on-time) set longer than the startup time $T_{START}$, the light source 110 may be turned on regardless of the rotation frequency of the motor 130. The forced on-time may be set to about 0.2 to 0.5 seconds. The following situations are conceivable: that is, the startup time $T_{START}$ may be longer than 0.2 seconds, or the rotation frequency may not reach the minimum rotation frequency due to factors such as deterioration of the motor 130, and adhesion of dust. Setting the forced on-time puts priority on lighting of the light source 110.

A modification of the second embodiment will hereinafter be described.

The lighting circuit 200a shown in FIG. 9 monitors the rotation frequency of the motor 130 and detects that the rotation frequency of the motor 130 reaches the minimum rotation frequency, but the present invention is not limited thereto. In a case where the startup time $T_{START}$ is stable with little scatter, the lighting device ECU 206 may measure an energizing time by the motor drive circuit 132, and the light source 110 may be turned on with a lapse of time corresponding to a designed value of the startup time $T_{START}$.

Third Embodiment

As described above, the light-distribution-pattern information S3 includes data indicating a light distribution pattern which is to be a target (hereinafter referred to as a target light distribution pattern). The target light distribution pattern constantly varies depending on situations in front of a vehicle and the like. Hereinafter described in the third embodiment is a lighting circuit 200a capable of lighting a light source 110 in accordance with the target light distribution pattern that is varied with time.

Figure 11:
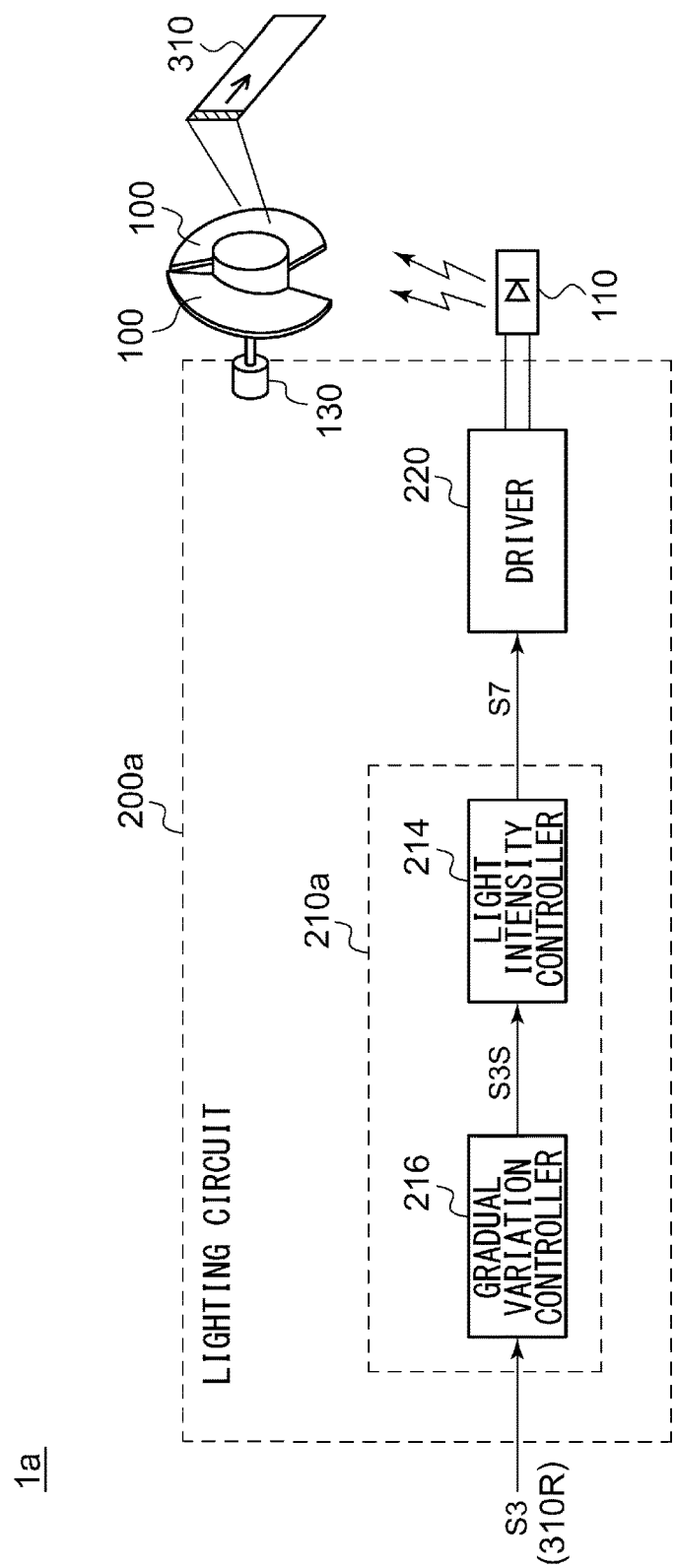
FIG. 11 is a block diagram of a vehicular lighting device according to a third embodiment.

FIG. 11 is a block diagram of a vehicular lighting device 1a according to a third embodiment. The vehicular lighting device 1a includes blades 100, the light source 110, and the lighting circuit 200a.

The lighting circuit 200a includes a light intensity calculator 210a and a driver 220. The light intensity calculator 210a receives light-distribution-pattern information S3 indicating the target light distribution pattern and calculates light intensity to be generated by the light source 110 at each time. At each time, the driver 220 turns on the light source 110 so as to obtain the light intensity calculated by the light intensity calculator 210a.

Hereinafter, the target light distribution pattern indicated by the light-distribution-pattern information S3 is denoted by a reference numeral 310R, and a current light distribution pattern formed in front of the vehicle by the vehicular lighting device 1a is denoted by a reference numeral 310.

When the target light distribution pattern 310R is varied, the light intensity calculator 210a calculates the light intensity at each time so that the light distribution pattern 310 is gradually varied with time toward the target light distribution pattern 310R after variation (also referred to as gradual variation control).

For example, the light intensity calculator 210a includes a light intensity controller 214 and a gradual variation controller 216.

The gradual variation controller 216 calculates a light distribution pattern 310S that is varied with time (referred to as a gradually-varied light distribution pattern) based on the target light distribution pattern 310R before variation and the target light distribution pattern 310R after variation, and generates information S3S indicating the gradually-varied light distribution pattern 310S. The light intensity controller 214 generates a light intensity command value S7 so as to obtain the gradually-varied light distribution pattern 310S indicated by the information S3S. Conversion from the gradually-varied light distribution pattern 310S to the light intensity command value S7 is as described in the first embodiment.

The above is the basic configuration of the lighting circuit 200a.

Figure 12:
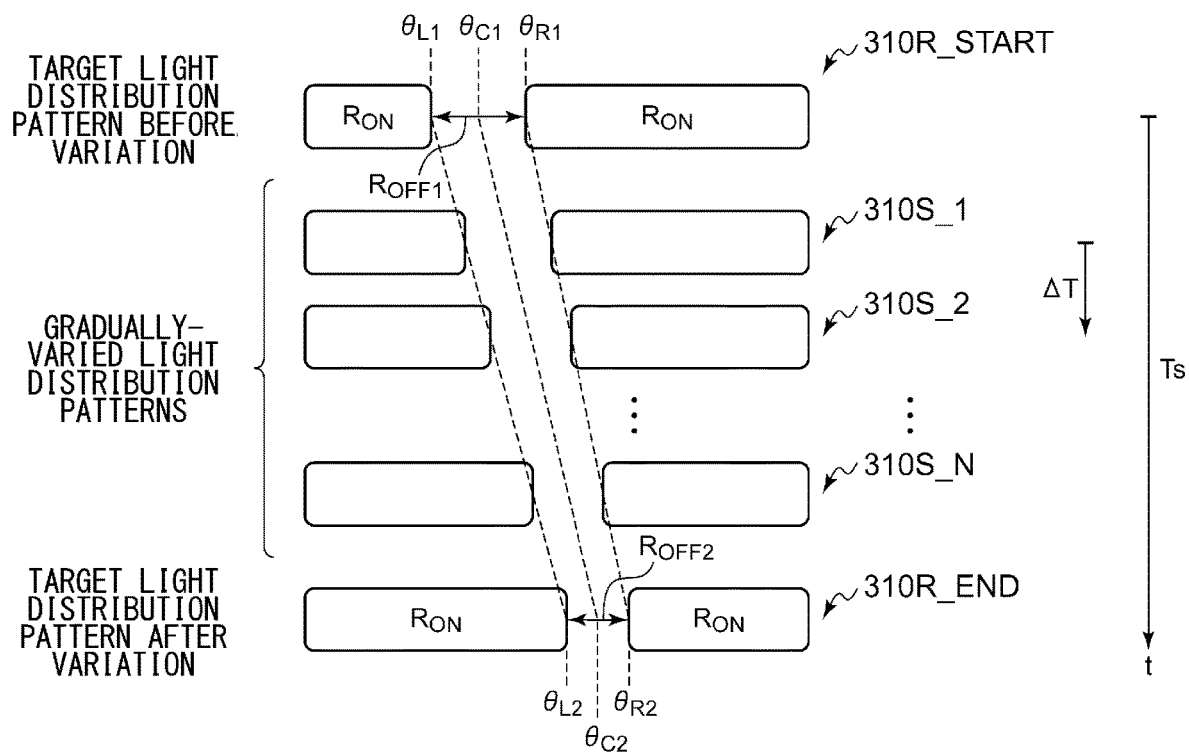
FIG. 12 is a view for describing gradual variation control of a lighting circuit.

Hereinafter, an operation of the lighting circuit 200a will be described. FIG. 12 is a view for describing gradual variation control of the lighting circuit 200a. FIG. 12 shows a target light distribution pattern before variation 310R_START, a target light distribution pattern after variation 310R_END, and a plurality of gradually-varied light distribution patterns 310S. In this example, the target light distribution pattern before variation 310R_START includes a first region (light-off region $R_{OFF1}$), and the target light distribution pattern after variation 310R_END includes a second region (light-off region $R_{OFF2}$) corresponding to the first region ($R_{OFF1}$).

The target light distribution pattern before variation 310R_START gradually transfers to the target light distribution pattern after variation 310R_END by way of the N number of gradually-varied light distribution patterns 310S_1 to 310S_N, where N represents plural number. A transition time of the light distribution pattern 310 is preferably 0.1 second or more and 10 seconds or less. Accordingly, it is possible to vary the light distribution pattern 310 while reducing a discomfort feeling given to a driver.

The above is the basic operation of the lighting circuit 200a. According to this lighting circuit 200a, in a platform imparted with a discontinuously varied target light distribution pattern 310R, the light intensity calculator 210a of the lighting circuit 200a can continuously vary the light distribution pattern 310 with time, which reduces a discomfort feeling given to a driver and/or enhances the safety.

From another point of view, a necessary operation for the vehicle (the ADB ECU 4 in FIG. 2) is to generate the light-distribution-pattern information S3 indicating the target light distribution pattern, but the vehicular lighting device 1a automatically carries out the gradual variation control so that it is possible to reduce the load of calculation carried out by the vehicle. In addition to the load of calculation carried out by the vehicle, it is possible to drastically reduce time and effort in a design stage at a vehicle manufacturer. These impart the vehicular lighting device 1a with a great additional value.

Hereinafter described is a specific process of generating the gradually-varied light distribution patterns 310S.

First Controlling Method

FIG. 13(a) is a view for describing a first controlling method. In the first controlling method, a speed of variation from the target light distribution pattern 310R_START to the target light distribution pattern 310R_END is determined in advance. The speed of variation herein may be that of a reference coordinate of each region included in the light distribution pattern 310. Specifically, a reference coordinate (a central coordinate $\theta_C$, a left end coordinate $\theta_L$, or a right end coordinate $\theta_R$) of a light-off region $R_{OFF}$ (or a light-on region $R_{ON}$) is varied at a predetermined speed. In this example, the gradually-varied light distribution patterns 310S are generated based on the central coordinate $\theta_C$ of the light-off region $R_{OFF}$ as a reference coordinate.

The light intensity calculator 210a generates gradually-varied light distribution patterns 310S so that the reference coordinate (central coordinate $\theta_C$) varies by a predetermined control step $\Delta\theta_S$ per unit time $\Delta T$. The unit time $\Delta T$ is, for example, a scanning time of the blades 100. The control step $\Delta\theta_S$ may be changeable in accordance with control from the ADB ECU 4.

The N number of steps is calculated by the following formula, using a difference (distance) $\theta_{C2}-\theta_{C1}$ between the central coordinate $\theta_{C1}$ of the first region $R_{OFF1}$ and the central coordinate $\theta_{C2}$ of the second region $R_{OFF2}$.

$N \approx (\theta_{C2}-\theta_{C1})/\Delta\theta_S - 1$ For example, when $(\theta_{C2}-\theta_{C1})$ is 10° and $\Delta\theta_S$ is 1°, the gradual variation control is completed by way of the N number of gradually-varied light distribution patterns 310S, where N represents 9. A transition time Ts is N×$\Delta T$ and varies in accordance with the distance between the two regions $R_{OFF1}$ and $R_{OFF2}$.

The light intensity calculator 210a may vary the gradually-varied light distribution patterns 310S so that one end and the other end of the first region $R_{OFF1}$ substantially simultaneously reach the one end and the other end of the second region $R_{OFF2}$ respectively. In this case, it is preferable that the left end coordinate $\theta_L$ of the light-off region $R_{OFF}$ moves a variation width represented by $(\theta_{L2}-\theta_{L1})/N$, and the right end coordinate $\theta_R$ of the light-off region $R_{OFF}$ moves along a variation width represented by $(\theta_{R2}-\theta_{R1})/N$.

From another point of view, this process is equivalent to a process in which the light intensity calculator 210a varies a width $\Delta\theta$ of the light-off region $R_{OFF}$ from the first region $R_{OFF1}$ to the second region $R_{OFF2}$ by the N number of steps.

FIG. 13(b) shows an operation in a case where the right end coordinate $\theta_R$ of each region is employed as the reference coordinate in the first controlling method. In this case, the light distribution pattern 310 is controlled so that the speed of the right end coordinate $\theta_R$ becomes constant. The left end coordinate $\theta_L$ may be used as the reference coordinate.

According to the first controlling method, when one light distribution pattern includes a plurality of regions, each region can be moved at the same speed so that natural ADB control can be achieved.

Second Controlling Method

FIG. 13(c) is a view for describing a second controlling method. In the second controlling method, a transition time (gradual variation time) Ts from the target light distribution pattern 310R_START to the target light distribution pattern 310R_END is determined in advance. Specifically, the reference coordinate (the central coordinate $\theta_C$, the left end coordinate $\theta_L$, or the right end coordinate $\theta_R$) of the light-off region $R_{OFF}$ (or the light-on region $R_{ON}$) moves over a predetermined transition time Ts regardless of a moving distance.

In this controlling method, the N number of steps is obtained by the following formula.

$$N = Ts/\Delta T$$

The symbol ΔT is a unit time, for example, the scanning time of the blades 100. The transition time Ts may be changeable in accordance with control from the ADB ECU 4.

The gradually-varied light distribution patterns 310S may be generated on the basis of the central coordinate $\theta_C$ of the light-off region $R_{OFF}$. In this case, the central coordinate $\theta_C$ moves along a variation width represented by $(\theta_{C2}-\theta_{C1})/N$.

The light intensity calculator 210a may vary the gradually-varied light distribution patterns 310S so that one end and the other end of the first region $R_{OFF1}$ substantially simultaneously reach the one end and the other end of the second region $R_{OFF2}$ respectively. In this case, it is preferable that the left end coordinate $\theta_L$ of the light-off region $R_{OFF}$ moves a variation width represented by $(\theta_{L2}-\theta_{L1})/N$, and the right end coordinate $\theta_R$ of the light-off region $R_{OFF}$ moves along a variation width represented by $(\theta_{R2}-\theta_{R1})/N$.

From another point of view, this process is equivalent to a process in which the light intensity calculator 210a varies a width Δθ of the light-off region $R_{OFF}$ from the first region $R_{OFF1}$ to the second region $R_{OFF2}$ by the N number of steps.

According to the second controlling method, the time required for the transition can be made constant without depending on the target light distribution pattern. In addition, when one light distribution pattern includes a plurality of light-off regions (light-on regions), movement of each region can be completed at the same time.

Hereinafter, variations of the gradual variation control of the lighting circuit 200a will be described.

Figure 14A:
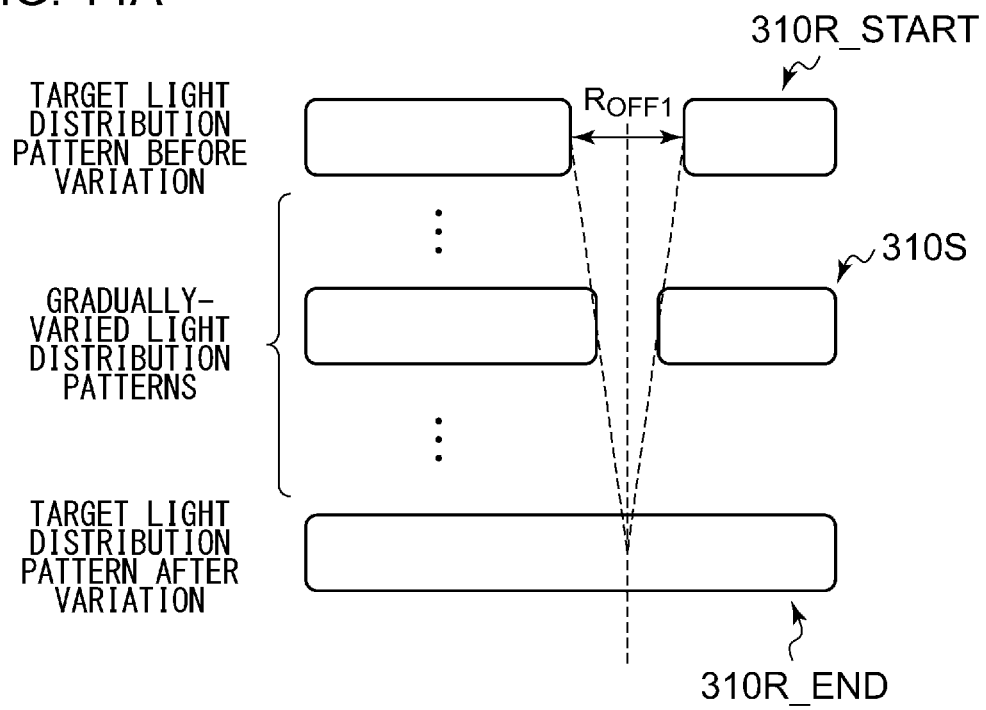
FIGS. 14A and 14B are views showing variations of the gradual variation control of light distribution patterns.
Figure 14B:
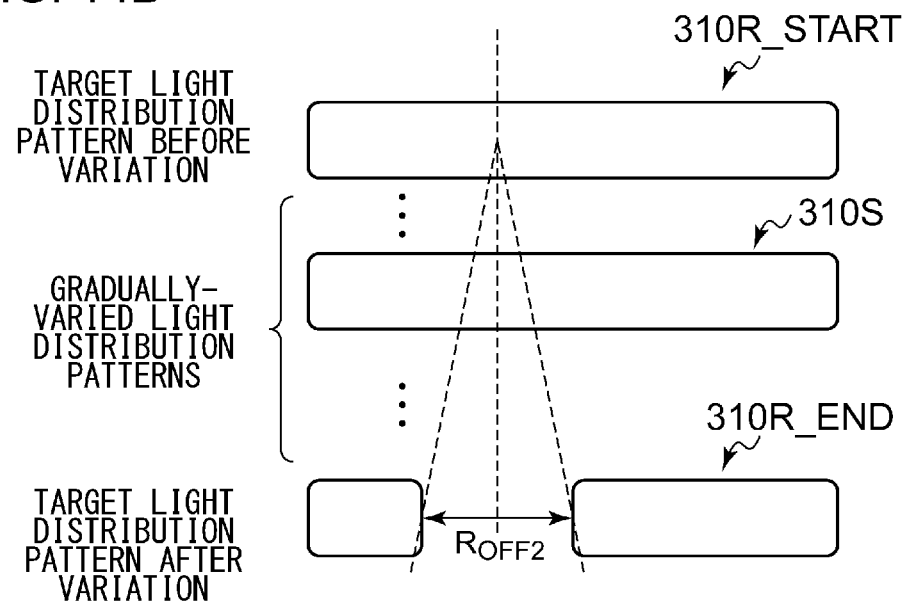

FIGS. 14(a) and 14(b) show control in a case where the target light distribution pattern before variation 310R_START and the target light distribution pattern after variation 310R_END do not include regions corresponding to each other.

FIG. 14(a) shows a case where the target light distribution pattern before variation 310R_START includes the first region $R_{OFF1}$ and the target light distribution pattern after variation 310R_END does not include a region corresponding to the first region $R_{OFF1}$. In this case, the light intensity calculator 210a slowly decreases a width of the first region $R_{OFF1}$ toward zero as time proceeds. Accordingly, it possible to naturally vary the light distribution pattern when an object to be irradiated with light disappears from the front of the vehicle.

More specifically, the light intensity calculator 210a may decrease the width of the first region $R_{OFF1}$ by moving both ends of the first region $R_{OFF1}$ toward the reference coordinate (for example, the central coordinates $\theta_C$).

FIG. 14(b) shows a case where the target light distribution pattern after variation 310R_END includes the second region $R_{OFF2}$ and the target light distribution pattern before variation 310R_START does not include a region corresponding to the second region $R_{OFF2}$. In this case, the light intensity calculator 210a slowly increases a width of the second region $R_{OFF2}$ from zero as time proceeds. Accordingly, it possible to naturally vary the light distribution pattern 310 when an object to be irradiated with light suddenly appears in front of the vehicle.

More specifically, the light intensity calculator 210a may increase the width of the second region $R_{OFF2}$ by moving both ends of the second region $R_{OFF2}$ in a direction departing from the reference coordinate (for example, the central coordinates $\theta_C$).

Figure 15:
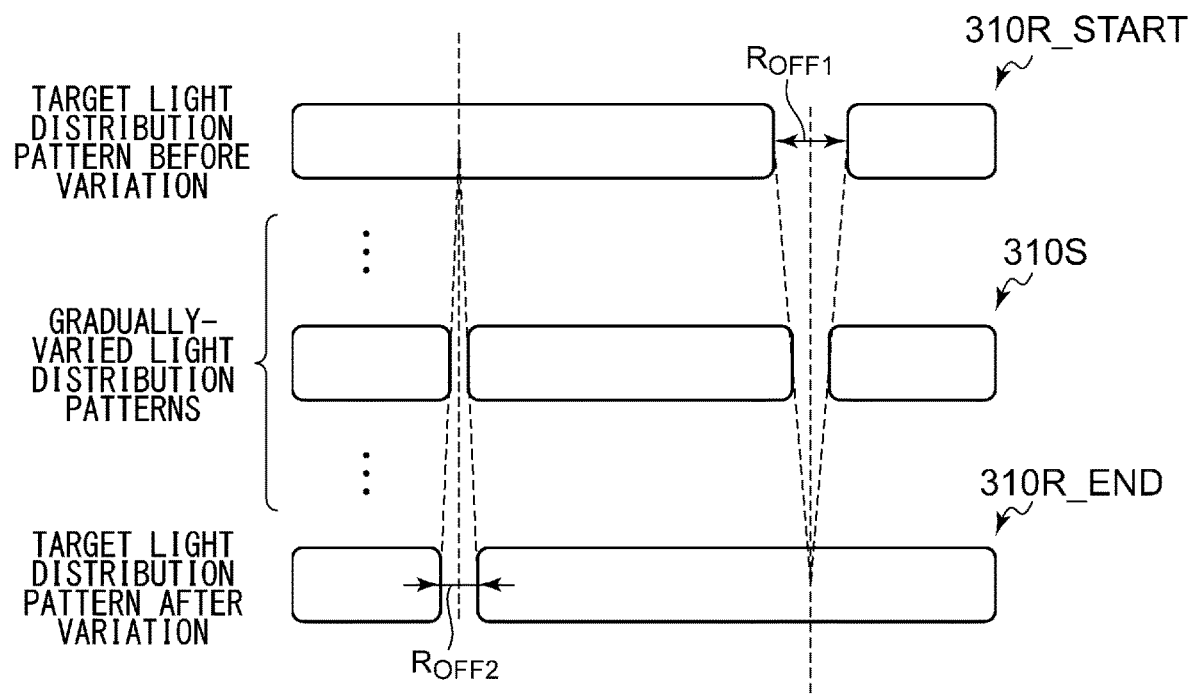
FIG. 15 is a view showing a variation of the gradual variation control of a light distribution pattern.

FIG. 15 shows control in a case where the first region $R_{OFF1}$ included in the target light distribution pattern before variation 310R_START does not correspond to the second region $R_{OFF2}$ included in the target light distribution pattern after variation 310R_END. In this case, the gradual control as described with reference to FIGS. 14(a) and 14(b) is preferably carried out on the first region $R_{OFF1}$ and the second region $R_{OFF2}$.

In a case where the distance between the first region $R_{OFF1}$ and the second region $R_{OFF2}$ is shorter than the predetermined threshold, the light intensity calculator 210a may make the first region $R_{OFF1}$ and the second region $R_{OFF2}$ correspond to each other, and carry out the gradual variation control as shown in FIG. 12. In a case where the distance between the two regions is longer than the threshold, the light intensity calculator 210a may carry out the gradual variation control as shown in FIG. 15, considering that the first region $R_{OFF1}$ and the second region $R_{OFF2}$ do not correspond to each other. The distance between the two regions may be a distance between reference coordinates of the two regions. In other words, the distance may be defined by a distance between the central coordinates $\theta_C$ (or the left end coordinates $\theta_L$ or the right end coordinates $\theta_R$) of the two regions.

In a case where the distance between the two regions is long, there is a high possibility that objects, within the two regions, which are to be irradiated in front of the vehicle are not identical. In a case where the distance between the two regions is short, there is a high possibility that objects, within the two regions, which are to be irradiated in front of the vehicle are identical. Therefore, natural ADB can be achieved by determining a correspondence relationship based on the distance.

Alternatively, in a modification, the light-distribution-pattern information S3 from the ADB ECU 4 may include data indicating whether the first region $R_{OFF1}$ and the second region $R_{OFF2}$ correspond to each other.

The ADB ECU 4 on the vehicle may discriminate an object irradiated in each region with high accuracy based on information such as a camera, and a vehicle speed. In this case, as the vehicle determines a correspondence relationship between the first and second regions, the accuracy improves.

There may be a situation where the target light distribution pattern 310R is varied before the light distribution pattern 310 reaches the target light distribution pattern 310R. In this case, the light intensity calculator 210a may set a current light distribution pattern 310 at the time of variation as the target light distribution pattern before variation 310R_START.

Figure 16:
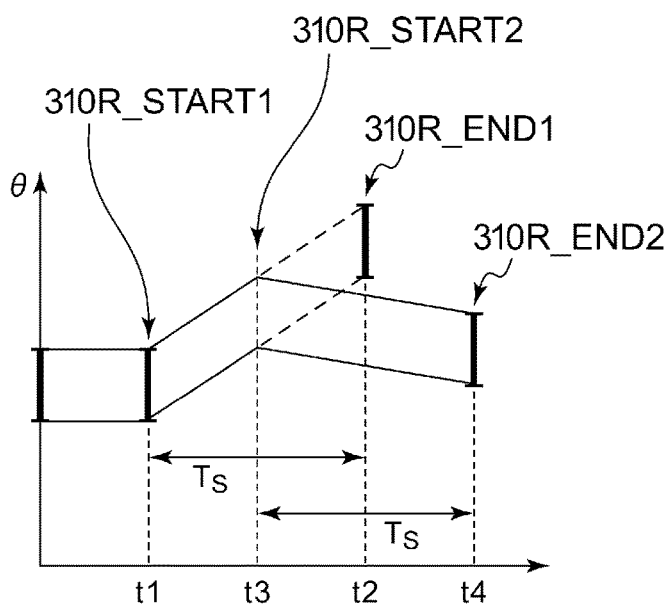
FIG. 16 is a view for describing a variation of a target light distribution pattern in the middle of a transition.

FIG. 16 is a view for describing variation of a target light distribution pattern in the middle of a transition. Herein, the second controlling method is employed, and a transition time Ts is defined. Before a time t1, a certain light distribution pattern is formed. At the time t1, the target light distribution pattern is varied to 310R_END1. After the time t1, the light intensity calculator 210a gradually varies the light distribution pattern so that the target light distribution pattern 310R_END1 can be obtained at a time t2 after the transition time Ts elapses from the time t1.

At a time t3 before the time t2, a target light distribution pattern 310R_END2 is newly set. The light intensity calculator 210a sets the light distribution pattern at the time t3 to the target light distribution pattern 310R_START2 before variation and gradually varies the light distribution pattern so that the target light distribution pattern 310R_END2 can be obtained at a time t4 after the transition time Ts elapses from the time t3.

According to this control, when a situation in front of the vehicle changes before the transition of the light distribution pattern is completed, the target light distribution pattern is immediately varied so that the light distribution pattern can be gradually varied to a new target light distribution pattern.

Modifications of the third embodiment will hereinafter be described.

Eighth Modification

In the first controlling method described in the third embodiment, one end and the other end of the first region $R_{OFF1}$ simultaneously reach one end and the other end of the second region $R_{OFF2}$ respectively, but the present invention is not limited thereto. One end and the other end of the first region $R_{OFF1}$ may reach one end and the other end of the second region $R_{OFF2}$ respectively at different times.

Ninth Modification

The gradual variation control of a light distribution pattern in the third embodiment may be based on the configuration of the lighting circuit 200 described in the first embodiment. In other words, the lighting circuit 200a shown in FIG. 11 may include the position detector 202 and the period calculator 204.

The vehicular lighting device 1a may control positions of the blades 100. In this case, the position detector 202 and the period calculator 204 are unnecessary, and it is possible to generate the light distribution pattern based on a control target value of the positions.

Tenth Modification

Figure 17:
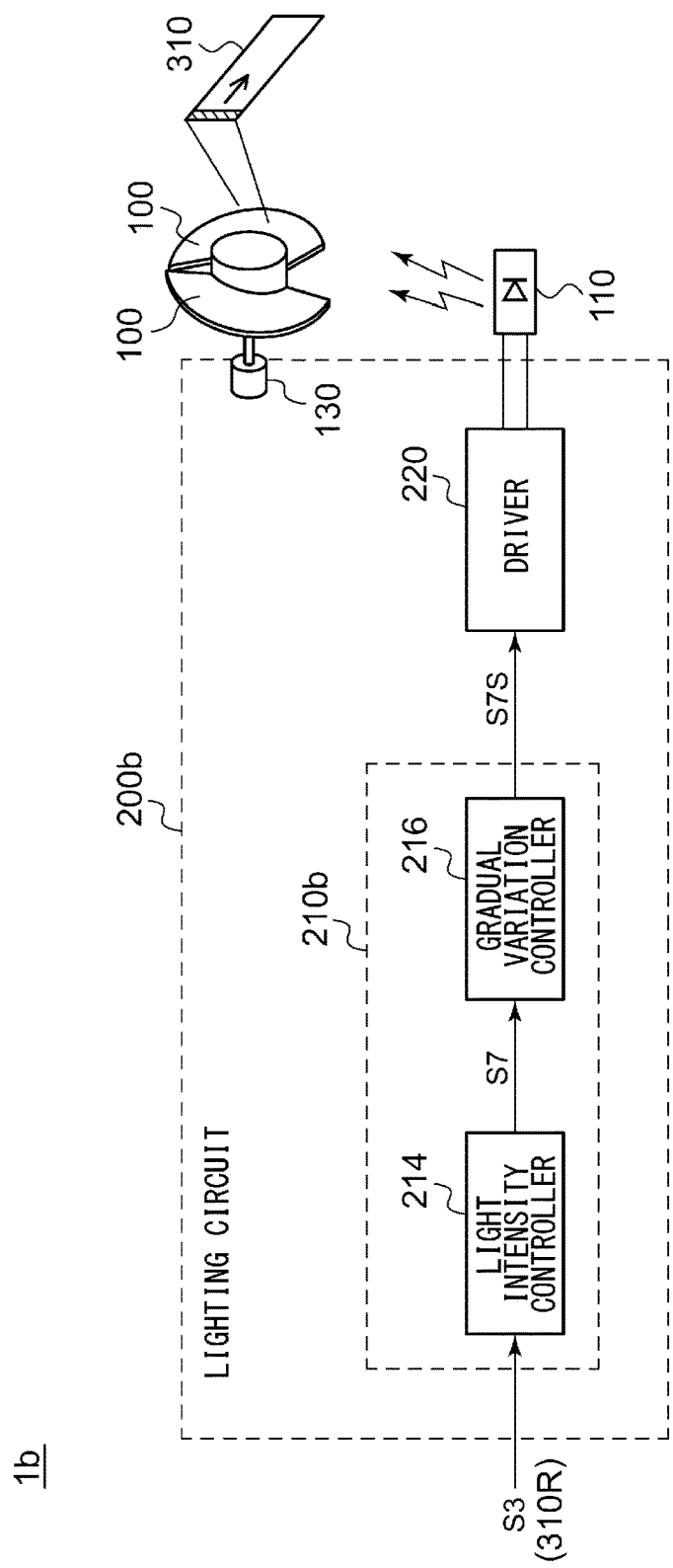
FIG. 17 is a block diagram of a vehicular lighting device according to a tenth modification.

FIG. 17 is a block diagram of a vehicular lighting device 1b according to a tenth modification. In this modification, the order of the gradual variation controller 216 and the light intensity controller 214 is switched. The light intensity controller 214 receives the light-distribution-pattern information S3 and generates the light intensity command value S7 corresponding to a target light distribution pattern. The gradual variation controller 216 generates a gradually-varied light intensity command value S7S that is gradually varied from a light intensity command value S7_START corresponding to the target light distribution pattern before variation to a light intensity command value S7_END corresponding to the target light distribution pattern after variation. Then, the gradual variation controller 216 outputs the gradually-varied light intensity command value S7S to the driver 220. According to this modification, the operation similar to the lighting circuit 200b shown in FIG. 5 can be carried out.

While the preferred embodiments of the present invention have been described using specific terms, such description is for illustrative purposes only, and it is to be understood that changes and variations may be made without departing from the spirit or scope of the appended claims.

What is claimed is:

1. A lighting circuit used for a vehicular lighting device, the vehicular lighting device comprising:
   a semiconductor light source; and
   a reflector structured to reflect emitted light of the semiconductor light source and to repeat a predetermined periodic motion so as to scan the front of a vehicle with reflected light of the emitted light, and
   the lighting circuit comprising:
   a position detector structured to generate a position detection signal indicating a timing at which a predetermined reference point of the reflector passes a predetermined position;
   a light intensity calculator structured to receive information on a light distribution pattern to be formed in front of the vehicle and to calculate light intensity to be generated by the semiconductor light source at each time based on the position detection signal; and
   a driver structured to light the semiconductor light source so as to obtain the light intensity calculated by the light intensity calculator at each time.

2. The lighting circuit according to claim 1, further comprising a period calculator structured to calculate a period of the periodic motion of the reflector based on the position detection signal,
   wherein the light intensity calculator is structured to calculate the light intensity to be generated by the semiconductor light source at each time based on the position detection signal and the period.

3. The lighting circuit according to claim 1, wherein the vehicular lighting device includes a plurality of semiconductor light sources, and the light intensity calculator is structured to individually determine light intensity to be generated by the semiconductor light sources at each time for each of the plurality of semiconductor light sources.

4. The lighting circuit according to claim 3,
   wherein the plurality of semiconductor light sources are connected in series,
   the light intensity calculator is structured to determine whether to turn on or off for each semiconductor light source, and
   the driver includes
   a converter structured to supply drive currents to the plurality of semiconductor light sources;
   a plurality of bypass switches corresponding to the semiconductor light sources and respectively provided in parallel with the corresponding semiconductor light sources; and
   a switch controller structured to control on-off state of the plurality of bypass switches in accordance with light-on/light-off instructions of the corresponding semiconductor light sources.

5. The lighting circuit according to claim 2, wherein the light intensity calculator is structured to turn off the semiconductor light source when the period is longer than a predetermined threshold.

6. The lighting circuit according to claim 1, wherein the reflector is provided with a slit, and the position detector includes a photosensor provided to the back side of the reflector.

7. The lighting circuit according to claim 1, wherein the reflector is rotatively controlled by a motor, and the position detector generates the position detection signal based on a Hall signal from the motor.

8. The lighting circuit according to claim 1, wherein the driver is structured to turn off the semiconductor light source when the reflector is able to receive the emitted light of the semiconductor light source at a predetermined range on its surface including its end portions.

9. A vehicular lighting device, comprising:
   a semiconductor light source;
   a reflector structured to reflect emitted light of the semiconductor light source;

a motor mounted with the reflector and that rotates so as to scan the front of a vehicle with reflected light of the reflector;

a motor drive circuit structured to drive the motor; and a lighting circuit structured to drive the semiconductor light source, wherein the lighting circuit turns on the semiconductor light source after the motor starts driving and after a rotation frequency of the motor reaches a predetermined minimum rotation frequency, wherein the motor drive circuit drives the motor so that the rotation frequency of the motor in a stopped state reaches the minimum rotation frequency in a time shorter than 0.2 seconds, and wherein the motor drive circuit is structured to turn on the semiconductor light source regardless of the rotation frequency of the motor after the motor in the stopped state starts driving and after a lapse of a predetermined time longer than 0.2 seconds.

10. A lighting circuit used for a vehicular lighting device, the vehicular lighting device comprising:

a semiconductor light source; and a reflector structured to reflect emitted light of the semiconductor light source and to repeat a predetermined periodic motion so as to scan the front of a vehicle with reflected light of the emitted light, and the lighting circuit comprising:

a light intensity calculator structured to receive light-distribution-pattern information indicating a target light distribution pattern to be formed in front of the vehicle and to calculate light intensity to be generated by the semiconductor light source at each time; and a driver structured to light the semiconductor light source so as to obtain the light intensity calculated by the light intensity calculator at each time, wherein when the target light distribution pattern is varied, the light intensity calculator calculates light intensity at each time so as to gradually vary a light distribution pattern with time toward the target light distribution pattern after variation.

11. The lighting circuit according to claim 10, wherein when the target light distribution pattern before variation includes a first region and the target light distribution pattern after variation includes a second region corresponding to the first region, the light intensity calculator varies the light distribution pattern in such a manner that one end and the other end of the first region substantially simultaneously reach one end and the other end of the second region respectively.

12. The lighting circuit according to claim 10, wherein when the target light distribution pattern before variation includes the first region and the target light distribution pattern after variation does not include a region corresponding to the first region, the light intensity calculator slowly decreases a width of the first region to zero as time proceeds.

13. The lighting circuit according to claim 10, wherein when the target light distribution pattern after variation includes the second region and the target light distribution pattern before variation does not include a region corresponding to the second region, the light intensity calculator slowly increases a width of the second region from zero as time proceeds.

14. The lighting circuit according to claim 11, wherein when the target light distribution pattern before variation includes the first region and the target light distribution pattern after variation includes the second region, the light intensity calculator makes the first region and the second region correspond to each other in a case where a distance between the first region and the second region is shorter than a predetermined threshold.

15. The lighting circuit according to claim 10, wherein a transition time of the light distribution pattern is 0.1 second or more and 10 seconds or less.

16. The lighting circuit according to claim 11, wherein when the target light distribution pattern is varied before the light distribution pattern reaches the target light distribution pattern, the light intensity calculator sets a current light distribution pattern at that time to the target light distribution pattern before variation.

* * * * *